United States Patent [19]
Leach et al.

[11] Patent Number: 6,108,715
[45] Date of Patent: Aug. 22, 2000

[54] METHOD AND SYSTEM FOR INVOKING REMOTE PROCEDURE CALLS

[75] Inventors: Paul Leach; Richard Draves, both of Seattle, Wash.

[73] Assignee: Microsoft Corporation, Redmond, Wash.

[21] Appl. No.: 08/892,774

[22] Filed: Jul. 15, 1997

Related U.S. Application Data

[63] Continuation of application No. 08/354,587, Dec. 13, 1994, abandoned.

[51] Int. Cl.[7] .......................................................... G06F 9/46
[52] U.S. Cl. ........................... 709/330; 709/203; 709/213
[58] Field of Search ............................ 395/684; 709/203, 709/212–219, 300–305, 315, 316, 311, 330

[56] References Cited

U.S. PATENT DOCUMENTS 5,566,302  10/1996  Khalidi et al. ........................... 709/312

OTHER PUBLICATIONS

"The Peregrine High–performance RPC System," by David B. Johnson & Willy Zwaenepoel, *Software–Practice and Experience*, vol. 23(2), pp. 201–221, Feb. 1993.

"Lightwave Remote Procedure Call, " by Brian Bershad et al., *Transactions on Computer Systems*, vol. 8(1), pp. 37–55, Feb. 1990.

Hamilton et al., "Subcontract: A Flexible Base for Distributed Programming," Sun Microsystems Laboratories, Inc., pp. 1–12, Apr. 1993.

Oney, Walter, "Mix 16–bit and 32–bit code in the applications with the Win32s Universal Thunk," Microsoft Systems Journal v8 n11 p. 39(16), Nov. 1993.

Johnson et al, The Peregrine High–performance RPC System, Software–Practice and Experience (vol. 23(2)), pp. 201–221, Feb. 1993.

Bershad et al, Lightweight Remote Procedure Call, Transactions on Computer Systems, (vol. 8, No. 1), pp. 37–55, Feb. 1990.

Bershad et al, Lightweight Remote Procedure Call, ACM, pp. 38–39, 54–55, Feb. 1990.

*Primary Examiner*—Alvin E. Oberley
*Assistant Examiner*—St. John Courteway, III
*Attorney, Agent, or Firm*—Klarquist Sparkman Campbell Leigh & Whinston, LLP

[57] ABSTRACT

A method and system that allows a client process to invoke a remote procedure. An operating system maintains a table with an entry for each remote procedure. Each entry of this table contains a signature that specifies a format in which parameters are exchanged between the client process and the remote procedure. When the client process requests the invocation of the remote procedure, the operating system creates a stack for the remote procedure. This stack is then mapped into the operating system's address space. By mapping the remote procedure's stack in this fashion, the operating system can simultaneously access the client's stack and the remote procedure's stack. The operating system then copies, in accordance with the remote procedure's signature, parameters directly from the client's stack to the remote procedure's stack. Once the parameters are copied, the remote procedure executes using the data contained on its own stack. When the substantive execution of the remote procedure is complete, the remote procedure traps back to the operating system. The operating system then copies, in accordance with the remote procedure's signature, return parameters from the remote procedure's stack to the client's stack. Once these parameters have been copied, the operating system returns to the client process so that the client process can continue with its execution.

50 Claims, 13 Drawing Sheets

Resource Table Entry

Signature Table Entry

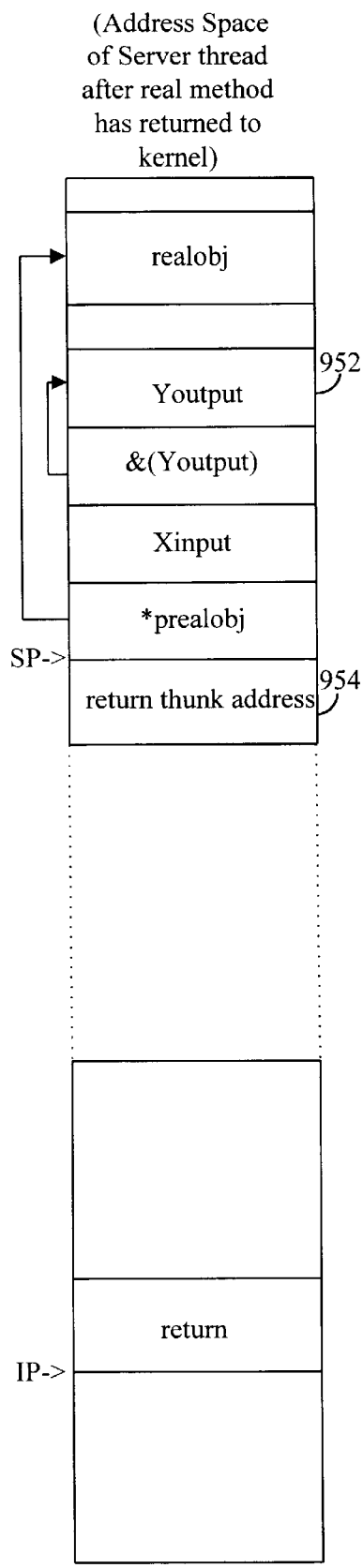
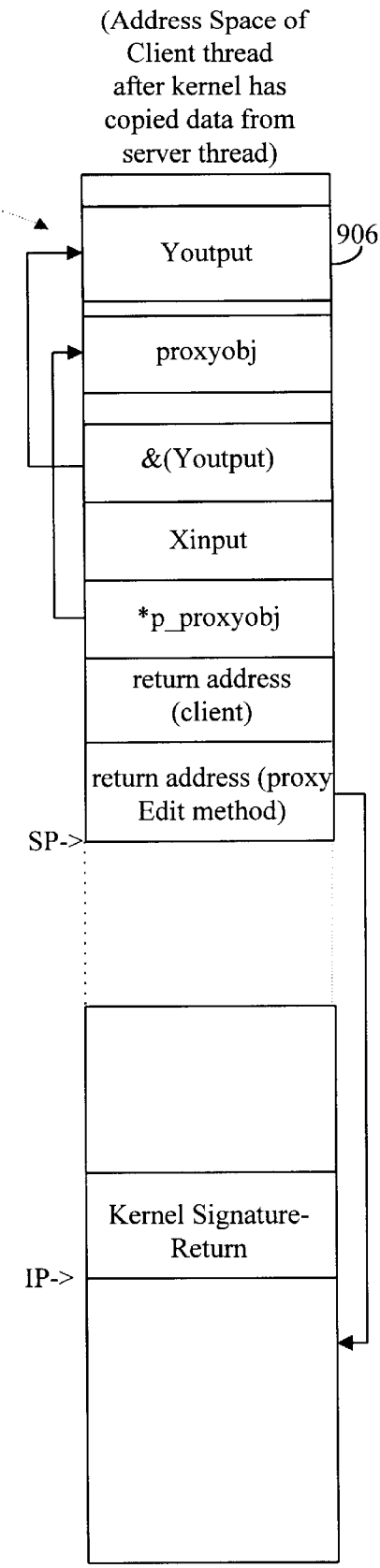
Fig. 9D
Fig. 9E

METHOD AND SYSTEM FOR INVOKING REMOTE PROCEDURE CALLS

CROSS REFERENCE OF RELATED APPLICATION

The present application is related to United Stated Patent Application entitled "Method and System for Providing Secure Access to Computer Resources," by inventor Richard Draves, now U.S. Pat. No. 5,802,590, filed on Dec. 13, 1994. This co-pending application is herein incorporated by reference.

This application is a file wrapper continuation of U.S. patent application Ser. No. 08/354,587, filed Dec. 13, 1994, now abandoned.

TECHNICAL FIELD

This invention relates generally to a computer method and system for transferring data and, more specifically, to a method and system for transferring data between processes in different address spaces.

BACKGROUND OF THE INVENTION

Computer systems typically have operating systems that support multitasking. A multitasking operating system allows multiple tasks (processes) to execute concurrently. For example, a database server process may execute concurrently with many client processes. A client process may request services by issuing a remote procedure call (RPC) to the database server process. A remote procedure call allows a server process to invoke a server procedure on behalf of the client. In conventional systems, the client process issues a remote procedure call by packaging the procedure name and the input parameters into an interprocess communications message and sending the message to the server process. The server process receives the message, unpackages the procedure name and the input parameters, and invokes the named procedure, passing it the unpackaged input parameters. When the procedure completes its execution, the server process packages any output parameters into a message and sends the message to the client process. The client process receives the message and unpackages the output parameters. The process of packaging parameters is known as marshalling, and the process of unpackaging parameters is known as unmarshalling. Using marshalling and unmarshalling to invoke a remote procedure may be disadvantageous because it may impose significant processing overhead (i.e., packaging and unpackaging parameters and sending the interprocess communications message). More specifically, the packaging/unpackaging of parameters and the sending of the interprocess communications message can require the copying of the parameters four distinct times (e.g., (1) copying from a stack of the client process to a client buffer, (2) copying from the client buffer to a kernel buffer, (3) copying from the kernel buffer to a server buffer, and (4) copying from the server buffer to a stack of the server process). Marshalling and unmarshalling may also be disadvantageous because it may require both the server process and the client process know the marshalling/unmarshalling protocol (i.e., the packing format of the interprocess communications message). By requiring the server and client processes to know the marshalling/unmarshalling protocol, the complexity of their code is increased while their portability is reduced.

The present invention is described below using some object-oriented techniques; thus, an overview of well-known object-oriented programming techniques is provided. A common characteristic of object-oriented programming languages is support for data encapsulation. Data encapsulation refers to the binding of functions and data. In the C++ programming language, data encapsulation is supported through the use of classes. A class is a user-defined type. A class declaration describes the data members and function members of the class. A function member is also referred to as a method of a class. The data members and function members of a class are bound together in that when a function member is invoked it operates on a particular occurrence of data members, known as an instance of the class. An instance of a class is also called an object of the class. Thus, a class provides a definition for a group of objects with similar properties and common behavior.

To allocate storage for an object of a particular type (class), an object is instantiated. Once instantiated, data can be assigned to the data members of the particular object. Also, once instantiated, the function members of the particular object can be invoked to access and manipulate the data members. Thus, the function members implement the behavior of the object, and the object provides a structure for encapsulating data and behavior into a single entity.

FIG. 1 is a block diagram illustrating typical data structures used to represent an object. An object is composed of instance data (data members) and function members, which implement the behavior of the object. The data structures used to represent an object comprise an instance data structure 101, a virtual function table 102, and function members 103, 104, 105. The instance data structure 101 contains a pointer to the virtual function table 102 and contains data members. The virtual function table 102 contains an entry for each virtual function member defined for the object. Each entry contains a reference to the code that implements the corresponding function member. The layout of this sample object conforms to models described in U.S. Pat. No. 5,297,284, entitled "A Method for Implementing Virtual Functions and Virtual Bases in a Compiler for an Object Oriented Programming Language," which is hereby incorporated by reference. One skilled in the art would appreciate that other object models can be defined using other programming languages.

An advantage of using object-oriented techniques is that these techniques facilitate the sharing of objects. For example, a process implementing the function members of an instantiated object can share the instantiated object with another process. In this case, the process that implements the function members of the instantiated object is the server process, and the process that remotely invokes the implemented function members is the client process. To access the instantiated object ("real object"), the client invokes the real object's function members. As mentioned above, conventional systems invoke remote procedures using marshalling/unmarshalling techniques. FIG. 2 illustrates these techniques as they are employed in an object-oriented environment (i.e., as they are employed to invoke a real object's function member). The client process creates a proxy object 210 that represents the real object 220. The proxy object contains methods with the same signature as the real object, but with a different implementation. The proxy object's methods do not perform the substantive processing of the real object's methods. Instead, the proxy object's methods perform only preliminary processing that enables the client process to invoke the real object's methods. For example, in conventional systems, each method of the proxy object marshals its name and its input parameters into an interprocess communications message and sends the message to a stub object 230. The stub object then unpacks the message and invokes the named method, passing any input parameters. When the execution of the named method is complete, the stub object marshals the named method's output parameters and sends them to the proxy object. The proxy object unmarshals the output parameters and returns from the invocation of the proxy object. At this point, the client process continues with its normal processing. As mentioned above, however, marshalling/unmarshalling techniques may be undesirable due to the amount of copying involved and due to the processing responsibilities that are imposed on the client and server processes.

SUMMARY OF THE INVENTION

The present invention is directed towards a facility for remotely invoking procedures. In the facility, a kernel maintains a signature table that specifies call and return signatures for each remote procedure. When a client process issues a remote procedure call, the client process places parameters needed by the remote procedure on its stack. In response to this remote procedure call, the kernel creates a stack for the remote procedure. This stack is created in the remote procedure's address space. Subsequently, the kernel maps the created stack into the kernel's address space. As will be explained below, this mapping enables the kernel to directly transfer data between the client's stack and the remote procedure's stack. The ability to conduct this direct transfer obviates the need to marshal and unmarshal data, and consequently, greatly reduces the amount of processing overhead incurred in each remote procedure call. After mapping the stack, the kernel retrieves the call signature for the remote procedure from the signature table. This call signature specifies locations for all necessary stack data (e.g., locations for input/output parameters, the server procedure's return address) of the server procedure. In conformity with the call signature, the kernel copies data directly from the client's stack to the server stack. After copying the data, the kernel passes processing control to the remote procedure. The remote procedure then executes using the data that has been copied onto its stack. When the remote procedure has completed its execution, the kernel recaptures processing control. The kernel then retrieves a return signature for the remote procedure from the signature table. Analogous to the call signature, the return signature specifies locations of any needed output data. In conformity with this return signature, the kernel copies output data directly from the remote procedure's stack to the client's stack. After copying this data, the kernel returns processing control to the client. In this manner, the present invention provides a facility that invokes remote procedures while minimizing the processing overhead imposed on the system.

BRIEF DESCRIPTION OF THE DRAWINGS

FIG. 9D illustrates the address space of the server thread after a real method of a server process has executed and returned to the kernel.

FIG. 9E illustrates the address space of the client thread after the kernel has copied server stack data to the client stack.

DETAILED DESCRIPTION OF THE INVENTION

Figure 1:
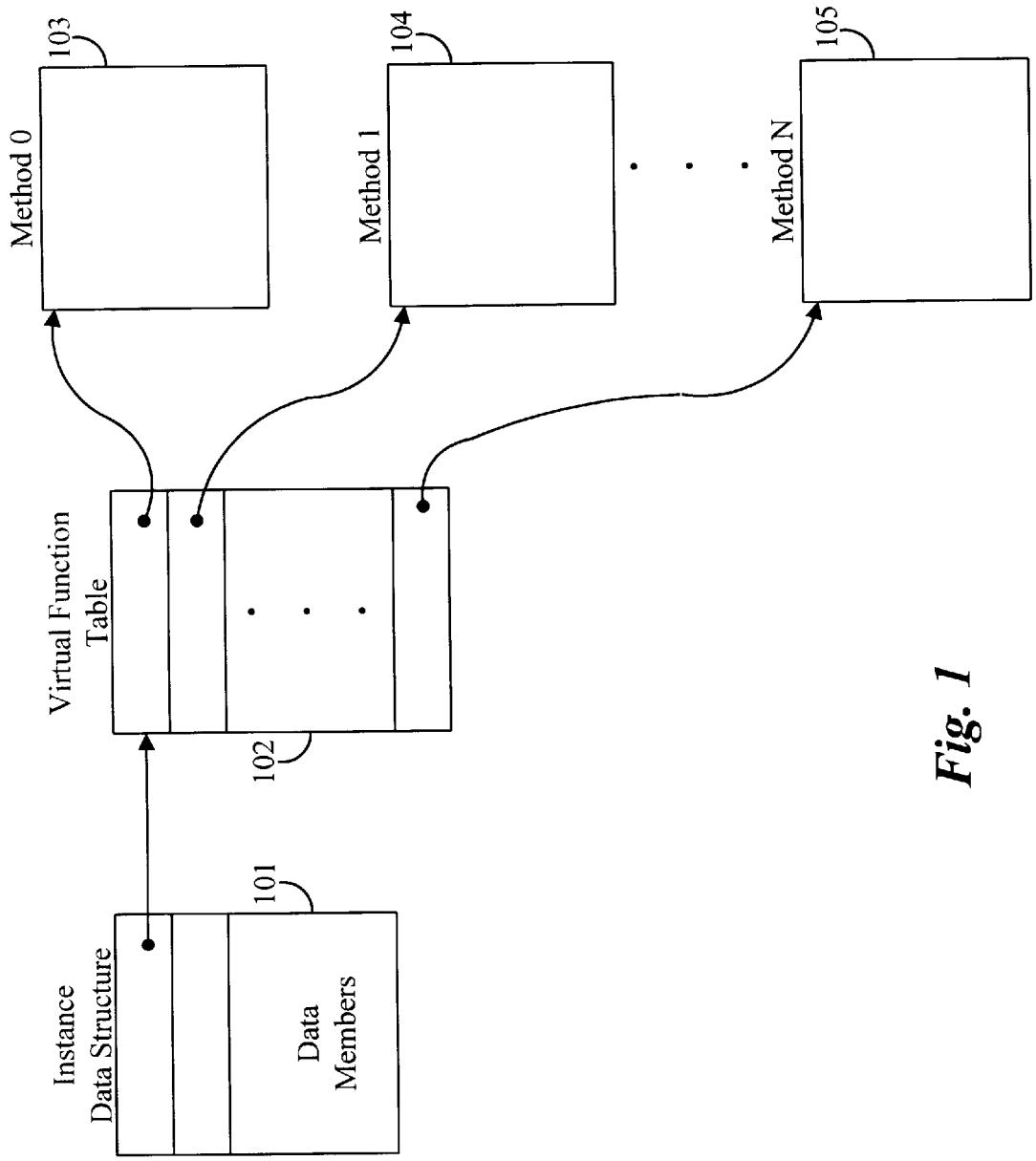
FIG. 1 is a block diagram illustrating typical data structures used to represent an object (prior art).
Figure 2:
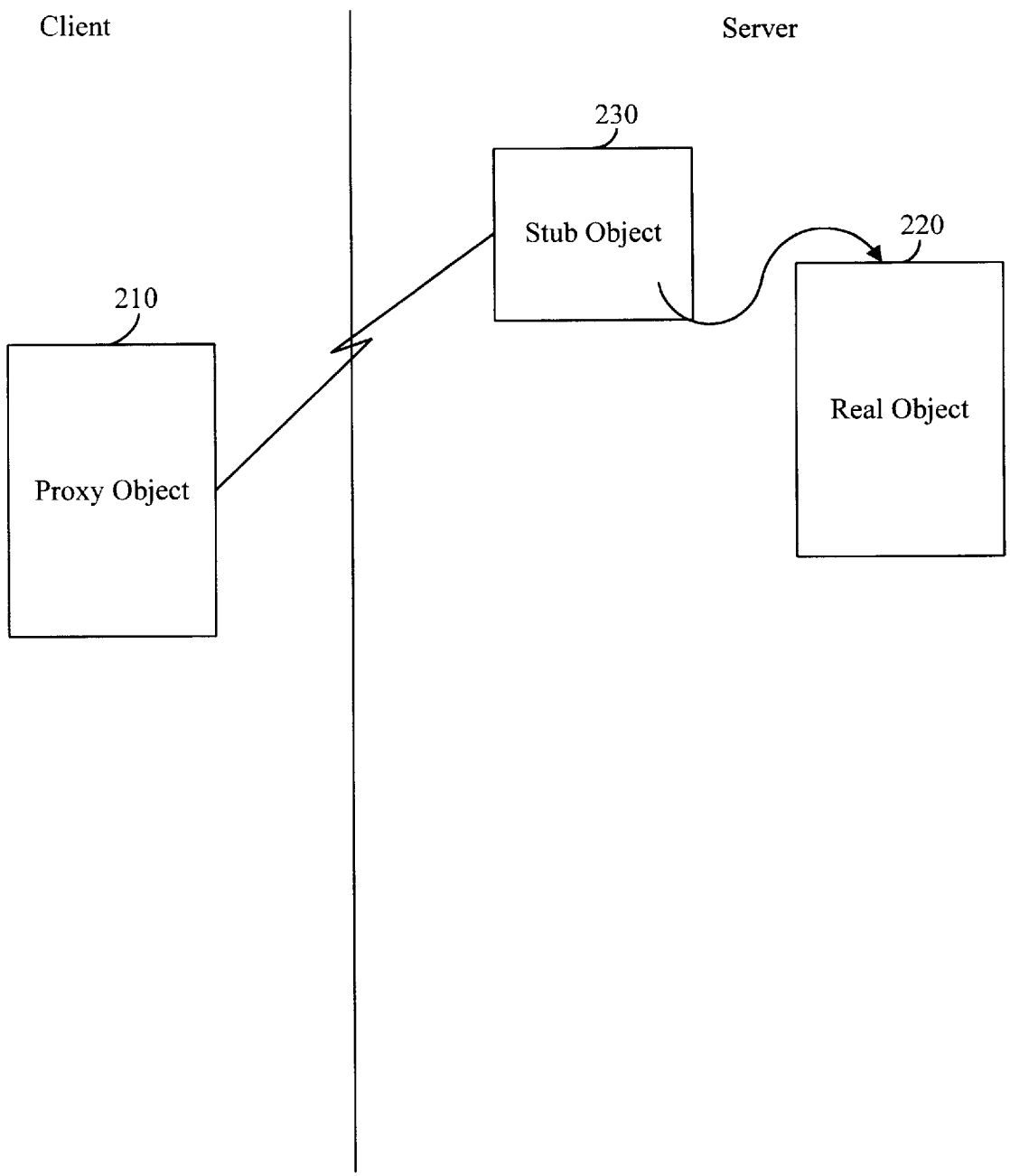
FIG. 2 illustrates marshalling/unmarshalling techniques as they are employed in an object-oriented environment (prior art).

The present invention is directed towards a facility for invoking remote procedures using direct stack-to-stack transfer of parameters. In a preferred embodiment, to invoke a remote procedure, a client process pushes parameters for the remote procedure onto its stack ("client stack") and invokes the kernel of the operating system. The kernel transfers the parameters from the client stack to the stack of the server process ("server stack") that implements the remote procedure call. To transfer the parameters, the kernel maps the server stack into the address space of the kernel. By mapping the server stack, the kernel can simultaneously access the client and server stacks. To identify the appropriate server process and the parameters for the desired procedure, the kernel maintains tables that identify (1) the server process that implements each remote procedure, (2) signatures for each remote procedure, and (3) the location, within the server process, of the remote procedure. After the parameters are copied, the kernel invokes the remote procedure. When the server process completes execution of the remote procedure, it returns to the kernel. The kernel then transfers any output parameters from the server stack to the client stack. After transferring these parameters, the kernel returns to the client. By using the direct stack-to-stack transfer of parameters, the system avoids the extra steps involved in marshalling and unmarshalling parameters during a remote procedure call.

In a preferred embodiment, each remote procedure is a method of a real object ("real method"). The client effects the invocation of the real method by invoking a method of a proxy object ("proxy method"). The proxy object contains a resource identifier that identifies the real object. When the proxy method is invoked, the parameters for the remote method are pushed onto the client stack along with a pointer to the proxy object. The proxy method then invokes the kernel passing an identifier ("method identifier") for the real method of the real object that the proxy object desires to invoke. The kernel uses the pointer to the proxy object to retrieve the resource identifier from the proxy object. The kernel maintains a table that contains an entry for each real object. This table is indexed by the resource identifier. Each entry contains the process identifier of the server process that implements the real object, the location of the real object within the server process, and the location of a table that contains signatures for each method of the real object. For each real object, the server maintains a table that specifies the signatures for each method of the class. This table is indexed by the passed resource identifier. Before an object can be accessed remotely, the server registers the real object with the kernel and provides the kernel with signature information for the class of the real object. By providing this information the server initializes the above-described tables.

The kernel uses the resource identifier and the passed method identifier to retrieve the associated information from the tables. The kernel then maps the server stack into the kernel's address space. After mapping the server stack, the kernel, in accordance with the real method's signature, copies the real method's parameters from the client stack to the server stack. The kernel also pushes the location of the real object pointer onto the server stack. The kernel then pushes the address of a thunk routine onto the server stack as the return address for the real method. The kernel also stores information in a server thread (e.g., a pointer to the client thread) identifying the client process so that the kernel can locate the client process when returning from the real method. The kernel then performs a context switch to access the server processes' address space. As will be described in more detail below, this context switch changes the current address space from the client process' address space to the server process' address space. After performing the context switch, the kernel sets an instruction pointer of the server thread to point to the real method and jumps to the real method to initiate its execution. The real method then executes using the parameters that the kernel pushed onto the server stack. When the real method returns, it pops the address of the thunk routine from the server stack and jumps to the thunk routine. The thunk routine transfers control back to the kernel.

When the kernel receives control from the thunk routine, it retrieves information identifying the client and the return signature. The kernel, with the server stack still mapped into the kernel's address space, performs a context switch to access the client process' address space. As the server's stack is mapped into the kernel's address space, the kernel can, after performing this context switch, simultaneously access the client's stack and the server's stack. The kernel then copies any output parameters from the server stack to the client stack in accordance with the signature of the real method. After copying the output parameters, the kernel transfers control to the client process with the instruction pointer pointing to the instruction that follows the client process' call to the proxy method. At this point, the client process continues its execution using the copied output parameters. In this manner, the present invention provides a facility that invokes remote procedures while minimizing the processing overhead imposed on the system.

Figure 3:
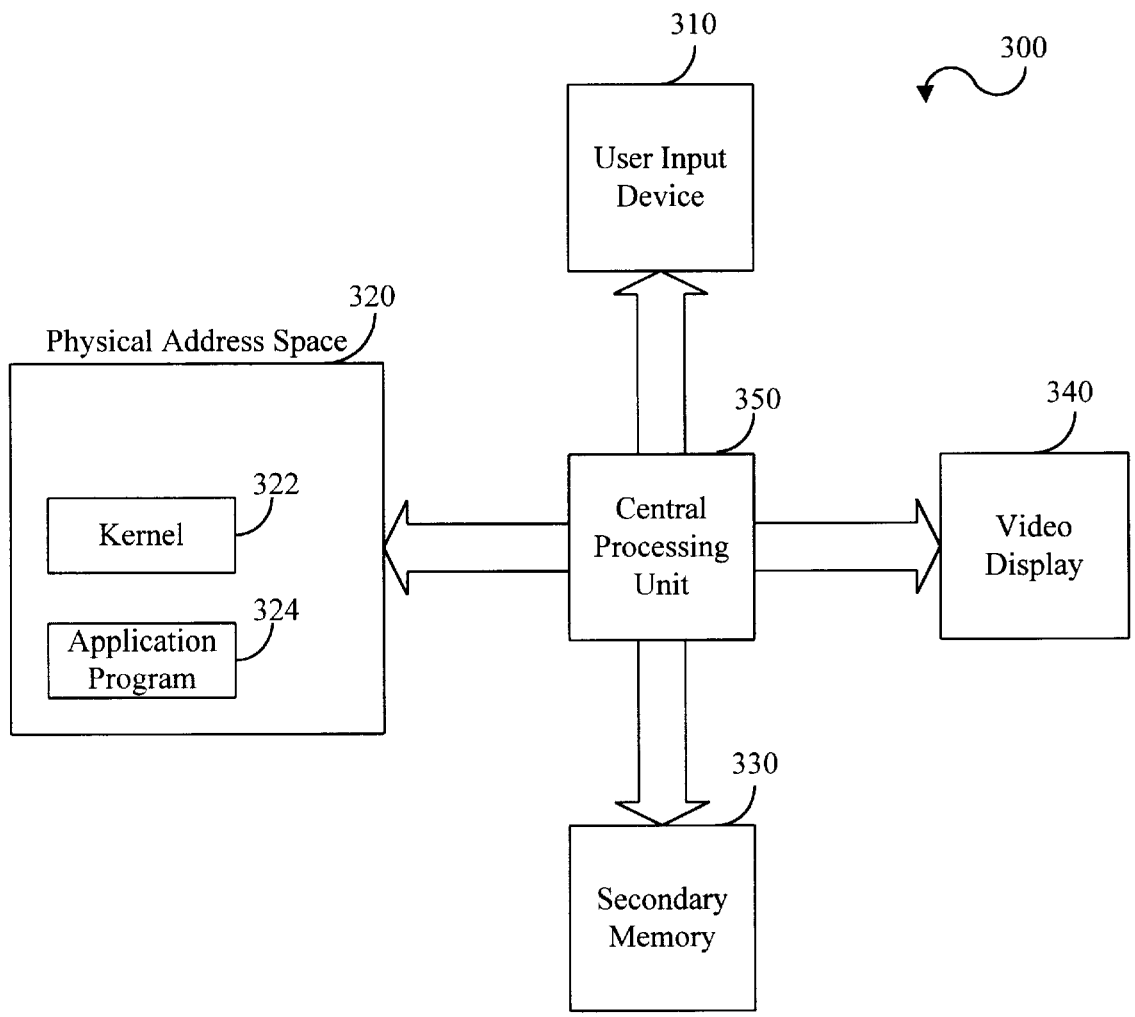
FIG. 3 illustrates a computer system for practicing a preferred embodiment of the present invention.

FIG. 3 illustrates a computer system for practicing a preferred embodiment of the present invention. As illustrated, the computer system 300 includes a user input device 310, a physical address space 320, a secondary memory 330, a video display 340, and a central processing unit 350. The physical address space contains an operating system kernel ("kernel") 322 and an application program 324. As is well known to those skilled in the art, computer programs can be loaded (e.g., from secondary memory) into the physical address space as the computer programs are needed. As the amount of physical address space is limited, a concept known as memory virtualization has been developed. This concept allows computer programs to utilize an address space that is larger than that actually available in the computer system's main memory. Memory virtualization is accomplished by allowing software programs to reference memory addresses that do not directly correlate to physical memory addresses. The memory locations that software programs address are known as virtual addresses. Collectively, a grouping of virtual addresses form a virtual address space. Similarly, a grouping of physical memory addresses form a physical address space. When a software program attempts to access a virtual memory address, the computer system translates the virtual memory address into a physical memory address. This translation may be accomplished in a number of ways (e.g., the translation may be accomplished by a hardware component, a software component, or a combination of both).

Figure 4:
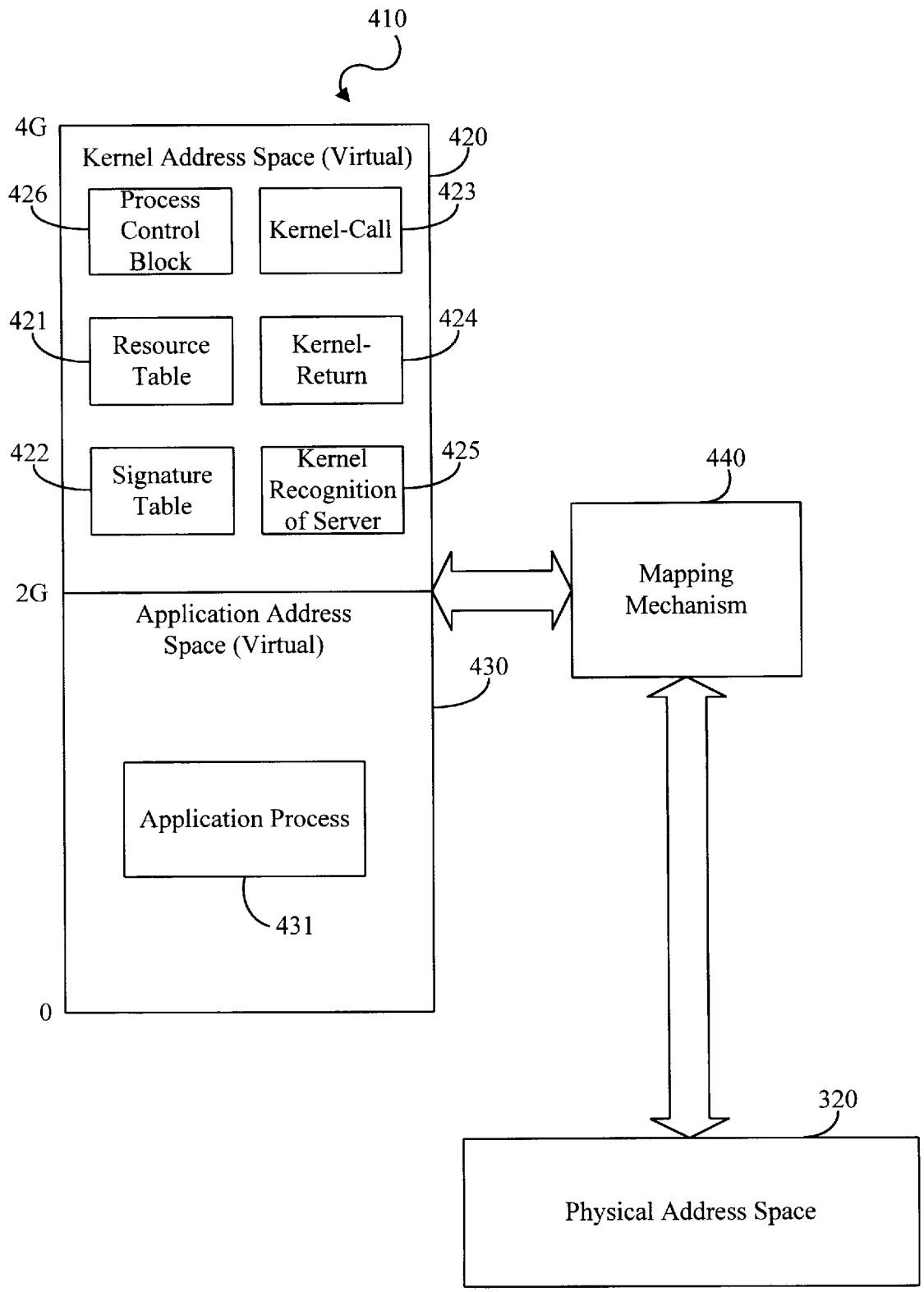
FIG. 4 illustrates a physical address space that is mapped to a virtual address space in a preferred embodiment of the present invention.

FIG. 4 illustrates a physical address space that is mapped to a virtual address space in a preferred embodiment of the present invention. As illustrated, the virtual address space is partitioned into a number of protected address spaces. A protected address space is one that allows only authorized processes to access its addresses. The virtual address space 410 of the preferred embodiment is 4 gigabytes in size with the upper 2 gigabytes reserved as the kernel's protected address space 420 and the lower 2 gigabytes reserved as a protected space for an application program 430. As illustrated, an application process 431 is shown as existing in the protected address space of the lower 2 gigabyte region. In the preferred embodiment, a single application process exists in the lower 2 gigabyte region at any time. As will be explained in detail below, this application process may be either the client process or the server process. Contained within the kernel address space is a resource table 421, a signature table 422, a Kernel-Call Routine 423, a Kernel-Return Routine 424, a Kernel Recognition of Server Routine 425, and a process control block 426. The kernel is responsible for managing memory, launching applications, and allocating system resources. In light of these responsibilities, the kernel frequently need to access the application program's protected address space. In order to access this protected address space, the kernel executes in "privileged mode." More specifically, by executing in privileged mode, the kernel is allowed to access the address space of processes that are mapped into the application program's address space. In contrast, processes in the application program's address space execute in "non-privileged" or "user mode." Processes that execute in user mode are not allowed to directly access each other's protected address space. Instead, these processes can only access each other's protected address space by interfacing with the kernel. In part, the preferred embodiment effectuates this interfacing by selectively mapping portions of an application process' address space to the kernel's protected address space. The virtual address space and the physical address space 320 are formed by a number of ordered pages. A page is a fixed-size block of memory that is formed by a number of consecutive addresses. In a preferred embodiment, a paging mechanism 440 selectively maps pages of the physical address space ("physical pages") to pages of the virtual address space ("virtual pages"). As will be explained in more detail below, the kernel gains simultaneous access to stacks of client and server processes by selectively mapping physical pages to virtual pages.

Figure 5:
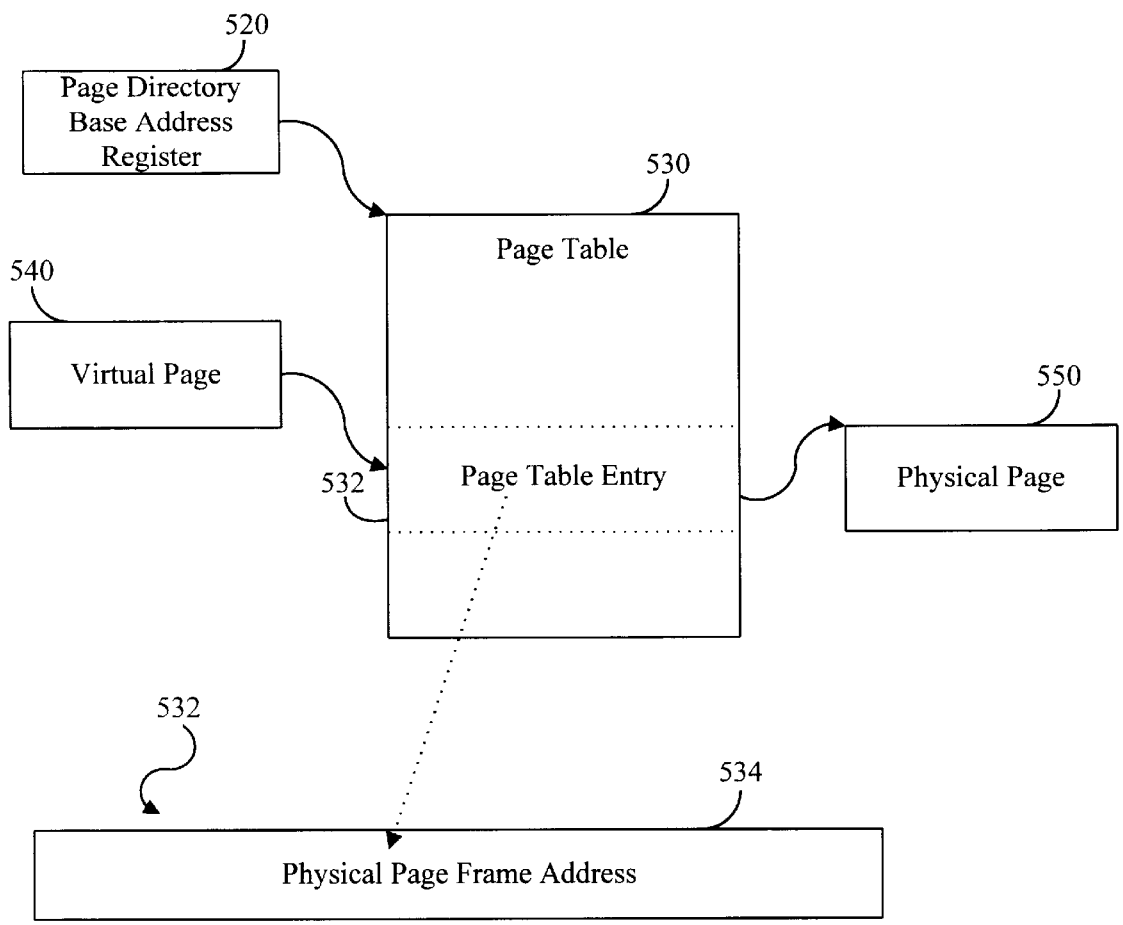
FIG. 5 illustrates a representative paging mechanism (prior art).

FIG. 5 illustrates a representative mapping mechanism. More specifically, FIG. 5 illustrates a simplified version of the paging mechanism that is employed in "INTEL" 80386 and related microprocessors. The actual paging mechanism of the 80386 employs a two-tier page table. However, the present invention is not limited to any particular paging mechanism: the illustrated mechanism has been simplified for purposes of clarity.

The mapping of a physical address space to a virtual address space begins by specifying a page directory base address in a page directory base address register 520. This base address identifies a page table 530 for a particular virtual address space (e.g., the virtual address space of a client process or a server process). The page table is composed of a number of page table entries 532. Each page table entry contains a physical page frame address field 534 for storing a page frame address. A page frame address is a physical address in the main memory to which a page of virtual memory is mapped. Each virtual address contains an index into the page table and an offset into the physical address space. The physical address is formed by adding the page frame address indexed by the virtual address to the offset. Thus, by changing the page frame address of a page table entry, a virtual page can be mapped to different physical pages.

Figure 6:
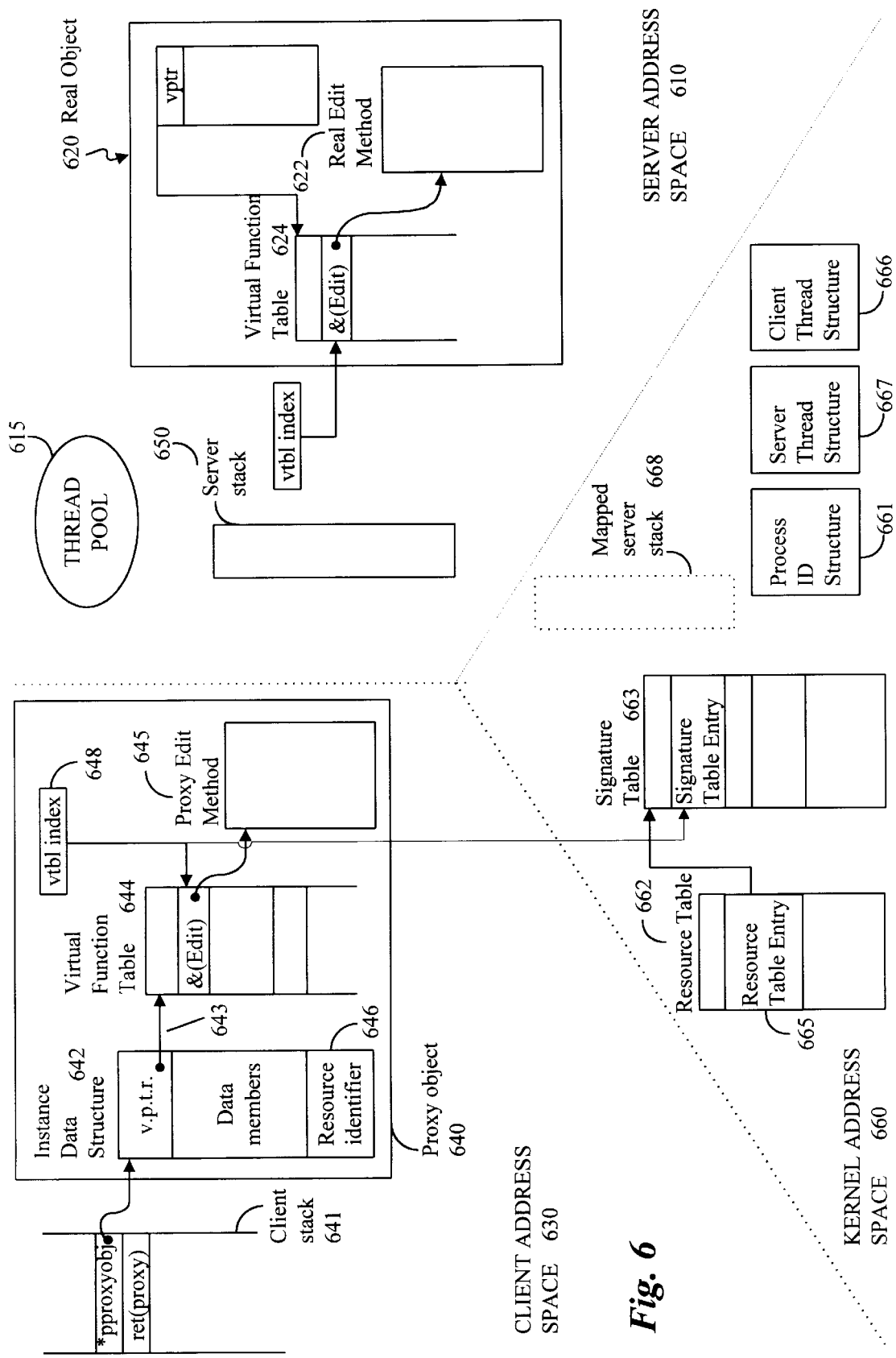
FIG. 6 illustrates an overview of a preferred embodiment of the present invention.

FIG. 6 illustrates an overview of a preferred embodiment of the present invention. More specifically, the figure illustrates how a client process interacts with the kernel to remotely invoke a server method. In brief, the figure illustrates a server address space 610 containing a real object 620, a client address space 630 containing a proxy object 640 that represents the real object, and a kernel address space 660 containing a resource table 662 and a signature table 663 to facilitate the remote invocation of server methods.

Figure 7:
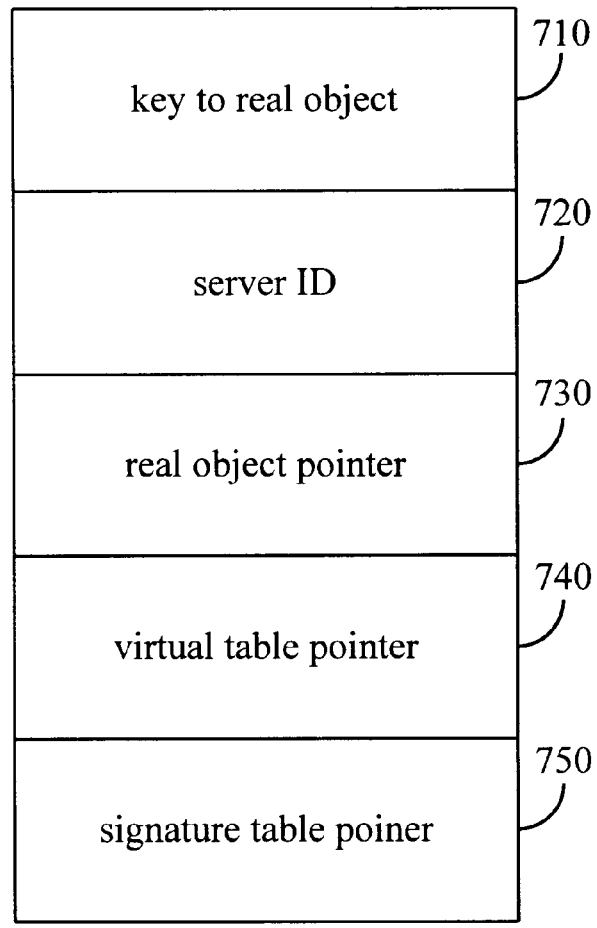
FIG. 7 illustrates fields of a resource table entry in a preferred embodiment of the present invention.

FIG. 7 illustrates the fields of a resource table entry in a preferred embodiment of the present invention. As explained above, a preferred embodiment of the present invention maintains a resource table entry for each real object. Each resource table entry contains a key to the real object 710, a server identifier 720, a real object pointer 730, a virtual table pointer 740, and a signature table pointer 750. As described in the above-identified co-pending patent application, the key to the real object is used to verify that the client process is authorized to access the real object. The server identifier is used to identify the server process that contains the real object 620. The real object pointer is used to identify an address of the real object in the server address space 610. The virtual table pointer is used to identify an address of a virtual table 624 that the kernel uses to invoke the real object's methods. The signature table pointer points to the signature table 663 that contains signatures for the methods of the real object 620.

Figure 8:
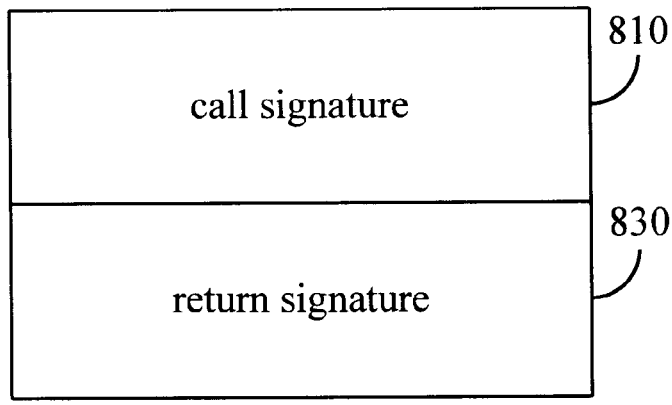
FIG. 8 illustrates fields of a signature table entry in a preferred embodiment of the present invention.

The signature table contains the signatures for the real object that is specified by the previously-described resource table entry. FIG. 8 illustrates the contents of a signature table entry. Each signature table entry contains a call signature 810 and a return signature 830. The call signature specifies the format in which the real object 620 expects to find the input and output parameters on the server stack 650. The signature specifies the format in which output parameters of the server method are stored on the server stack. In a preferred embodiment, these signatures are implemented as pointers to code that construct the server stack so that it appears that the real method has been invoked locally (i.e., so that the server stack has immediate access to all the parameters and data that the method needs to execute). The code for the call signatures copies the parameters from the client stack to the server stack. When a parameter is a pointer to data, the code also copies that data onto the stack. For example, the code for a call signature of a method that utilizes a pointer to a variable as a parameter would construct the server stack to contain storage for the pointer parameter as well as storage for the variable itself. More specifically, the code would set the value of the pointer parameter to point to the storage location of the variable and then copy the data pointed to by the parameter on the client stack. One skilled in the art would appreciate that the code for the call signature could support the passing of more complex data structures. The call signature also allocates storage for a return address of the real method on the stack. As will be explained in more detail below, the code stores a return thunk address as the return address for the real method. This return thunk address points to code that traps to the kernel. Additionally, in object oriented environments, the call signature would store a pointer to the real object. This pointer is known as the "this pointer" and specifies the object for which the method was invoked. The operation of the call and return signatures will be explained with more detail with reference to FIGS. 9A, 9B, 9C, 9D, and 9E.

The above-described table entries are created when a server process registers with the server. This registration allows the server process to be accessible for remote execution. In a preferred embodiment, the server process issues a system call to request registration as a server. The kernel responds to this request by generating a thread pool 615 for the server process. The thread pool contains a collection of thread control blocks. Each thread control block contains thread state information (e.g., an instruction pointer, a stack pointer, register values) for a respective thread of execution of the server process. In its entirety, the thread pool identifies the total number of threads of execution that may be concurrently executing in the server process. The thread pool also serves as a thread cache. That is, when a thread of execution is completed, the kernel caches the thread control block in the thread pool. In this manner, the cached thread control block can be retrieved for a subsequent remote procedure call. By retrieving a thread control block, the kernel can quickly access the stack that is referenced by the thread control block: as will be explained in more detail below, the thread control block references a server stack that is mapped into the kernel's address space. On the other hand, when the thread pool is empty (e.g., when there are no available thread control blocks), the kernel, depending on the particular implementation, either waits for a thread control block to become available, or generates an additional thread control block. The kernel also stores a return thunk in the server's address space. The kernel stores an address of this return thunk in the process ID structure 661 for the server process. This address is later retrieved and pushed onto a server thread's stack in order to permit a remotely executed real method to return to the kernel. As will be explained in more detail below, this return thunk address is used to transfer processing control from a remotely executed server method to the kernel address space 660. After identify itself as a server, the server process can export a number of real objects to the kernel. In a preferred embodiment, the server process exports a set of signatures for each class and an address of each real object that the server wishes to make available to client processes. For each exported class, the kernel generates a resource table entry 665 and a signature table 663.

A client process initiates the remote invocation of a server method by invoking the proxy method that corresponds to the desired server method. The client process invokes a proxy object method by specifying a pointer to the proxy object, as well as the desired method identifier. In the example that follows, the desired method is identified by the name "Edit." For example, using pseudocode for the C++ programming language, the client process can invoke the Edit method with the following command:

pproxyobj→Edit(X&Y).

In the above pseudocode, "X" represents an input parameter and "&Y" represents an output parameter. More specifically, the "&Y" output parameter specifies an address at which data for a "Y" output variable is to be stored. The above pseudocode compiles to code that pushes the parameters, the "this" pointer (i.e., pproxyobj), and the return address of the proxy Edit method on the client stack 641. As mentioned above, the "this" pointer specifies the object for which the proxy Edit method has been invoked. More specifically, the "this" pointer points to the instance data structure 642. The instance data structure contains a virtual function pointer 643 that points to a virtual function table 644. The methods of the virtual function table are identified by a virtual table index. As illustrated, the second entry of the virtual function table is the desired proxy method. By convention, a virtual function table is indexed from 0 to n−1, where n is the total number of table entries. Therefore, the proxy Edit method 645 has a virtual table index of one. This virtual table index is passed to the kernel in order to allow the client process to access the real Edit method 622 contained within the real object 620. In a preferred embodiment, the proxy Edit method loads a register 648 with the virtual table index for the desired function before invoking the kernel. Therefore, in the illustrated example, the proxy Edit method loads the register with a value of one.

When the kernel executes, it retrieves the contents of the proxy object pointer from the client stack 641 in order to access the instance data structure 642. The kernel then retrieves, from the instance data structure, a resource identifier for the real object 620. This resource identifier is used to locate an entry of the resource table 662 for the real object. In a preferred embodiment, this resource identifier is a handle\key pair. Having retrieved the resource identifier, the kernel determines the resource table entry 665 for the real object. In an embodiment where the retrieved resource identifier is a handlekey pair, the retrieved key is compared with the key stored in the resource table entry in order to verify that the client process is authorized to access the real object. The details on the use of this handlekey pair is described in the above. incorporated co-pending patent application Ser. No. 09/121,326, filed on Dec. 13, 1994, entitled "Method and System for Providing Secure Access to Computer Resources," by inventor Richard Draves. Those skilled in the art will realize that the retrieved resource identifier need not be a key. For example, in systems where security is not an issue, the resource identifier could be a small numerical identifier such as a handle.

After determining the resource table entry 665 for the real object 620, the kernel retrieves the process identifier from the resource table entry. The kernel then creates a server thread for, or retrieves a server thread from, the previously allocated thread pool 615. Each server thread has its own server stack 650. When creating a server thread, the kernel initializes a server thread structure 667 for the real method 622. The server thread structure contains register values (e.g., stack and instruction pointer values) for the created thread. After creating the server thread, the kernel maps the server thread stack 650 into the kernel's address space 660. By mapping the server stack 668 to the kernel's address space while the client process is mapped into the application program's protected address space, the kernel can copy data directly between the client stack 641 and the server stack; thus, avoiding the processing overhead of conventional marshalling/unmarshalling techniques.

Having mapped the server thread's stack into the kernel's address space, the kernel continues processing by structuring the server's stack 668 so that it simulates the client stack 641. That is, the kernel sets the server thread's stack pointer and allocates storage for the method's parameters and associated data so that the server stack appears as if the real method 622 was invoked locally. The signatures of the prototype table are used to facilitate this stack construction. The kernel then determines the location of the signature table 663 via the resource table entry's 665 signature table pointer 750. After determining the location of the signature table, the kernel uses the virtual function table index passed in register 648 to determine the appropriate signature table entry 669 for the real method 622.

Having determined the needed signature table entry 669, the kernel stores a pointer to the signature table entry in the server thread structure 667 so that the real method can be identified when the server returns to the kernel. Subsequently, the kernel copies the data directly from the client stack 641 to the server stack 668 in accordance with the call signature 810 of the signature table entry. When making this copy, the kernel allocates stack space for both the actual input and output parameters, as well as any necessary storage area for respective input or output parameters. For example, in the case of the Edit (X,&Y) method, the method specifies an address of variable "Y" as an output parameter. In this case, when the call signature code is executed, the kernel allocates not only storage on the server stack for the address of "Y" but also for the data of "Y." On the server stack, the kernel modifies the parameter that specifies that address of "Y" so that the parameter points to the storage allocated for the data of Y. Similarly, if the "X" input parameter was a pointer, the call signature code would allocate, on the server's stack, storage for the pointer as well as the data that the pointer pointed to. Once the kernel has structured the server stack in this manner, the kernel copies input parameters from the client stack to the server stack. After copying the input data, the kernel retrieves the resource table entry's 665 real object pointer 730. The kernel then stores the contents of the real object pointer on the server stack in accordance with the call frame signature 810. These contents are the contents of the "this" pointer for the real object. Additionally, the kernel retrieves the previously stored address of the return thunk from the process ID structure 661 using the process ID 720 contained within the resource table entry. The kernel stores, in accordance with the call signature 810, a return address pointer for the server stack 668. In this manner, the real method will, after completing its execution, return to the previously created return thunk. As will be explained below, this return thunk traps to the kernel. The storage of this stack data will be explained in more detail below with reference to FIGS. 9A, 9B, 9C, 9D and 9E.

Once the kernel has stored the above-described data on the server stack 668, the real method 622 has all the information that it needs for its execution. However, prior to transferring to the real method, the kernel stores a pointer to a client thread structure 666 in the server thread structure 667. By storing this pointer, the kernel will be able to identify the thread of the client process that invoked the real method when the real method returns to the kernel via the return thunk. After storing the client thread pointer, the kernel performs a context switch from the client process to the server process. This context switch maps the server process into the application program's protected address. In a preferred embodiment, this context switch is accomplished by loading the page directory base address register 520 with the address of the server process' page table 530. Subsequently, the kernel determines the real method's address. More specifically, the kernel determines the real method's address using the via table index passed in register 648 to index into the virtual function table pointed to by the resource table entry's 665 virtual table pointer 740. As illustrated, the resource table entry's virtual table pointer references the virtual function table 624 of the real object 620. However, for some embodiments, the virtual function table pointer 740 in the resource table entry 665 will not reference the real object's 620 virtual function table pointer. Instead, to provide for the flexibility of combining marshalled remote procedure calls and non-marshalled remote procedure calls in a single object. For example, consider an object having two methods, Edit and ComplexEdit. The method Edit, as described above, is implemented with a non-marshalled remote procedure call. For this method, the virtual function table pointer 740 contains the same function pointer as the virtual function table 624; thus, the kernel directly calls the real object's Edit method. However, suppose that the ComplexEdit method uses an argument that is too complex for non-marshalled remote procedure calls. In this case, the proxy ComplexEdit method marshals the argument. Effectively, this marshalling transforms the ComplexEdit method into a SimplifiedEdit method. For this case, the virtual function table pointer 740 contains a pointer to a SimplifiedEdit method in the server and not, as in the previously-described case, to the virtual function table 624 of the real object 620. This SimplifiedEdit method unmarshals the complex argument and calls the real object's ComplexEdit method. The SimplifiedEdit method locates the real object 620 as its "this" argument via the real object pointer 730 of the resource table entry 665 and determines the ComplexEdit method's address using the virtual function table 624. By allowing a single object to accommodate, both marshalled and nonmarshalled procedure calls, the present invention simplifies the code that is required to implement and to access the server process' methods. After determining the real method's address, the kernel jumps to the determined real method address to allow the real method 622 to execute.

In an alternative embodiment, where the exported class of the real object uses a method with a parameter that is too complex to be passed via stack-to-stack copying, the resource table entry's virtual function table pointer references an unmarshalling stub in the server process' address space. In this embodiment, the proxy method marshalls the complex parameter into a buffer and sends the buffer to the kernel. The kernel then passes the complex parameter to the server process. More specifically, the kernel forwards a buffer containing the packed complex parameter to the unmarshalling stub. The kernel also forwards, to the unmarshalling stub, the real object pointer (e.g., the real object pointer can be forwarded implicitly as a "this" pointer) and the virtual table index. The unmarshalling stub unpacks the complex parameter and copies it onto the server stack. The unmarshalling process is described in the co-pending United States Patent Application entitled, "Method and System for Network Marshalling of Interface Pointers for Remote Procedure Calls," by Anthony S. Williams, Robert G. Atkinson, Richard Hill, Alex Mitchell, Paul Leach and Shannon Chan, Ser. No. 08/158,627, filed on Nov. 29, 1993, and assigned to a common assignee. This co-pending application is incorporated herein by reference. After the complex parameter has been copied onto the server stack, the unmarshalling stub dereferences the real object's pointer to identify the real object's virtual function table. By indexing into the virtual function table using the passed virtual table index, the unmarshalling identifies and invokes the real object's method. This alternative embodiment provides for clean and efficient handling of complex parameters. For classes of the real object that do not pass complex parameters, the parameters can be exchanged using direct stack-to-stack transfer. By providing for marshalling/unmarshalling as well as direct stack-to-stack transfer, the present invention reduces processing overhead as only those calls that require the passing of complex arguments undergo the marshaling/unmarshalling process.

While the real method 622 is executing, the preferred embodiment leaves the server stack 668 mapped into the kernel address space 660 as an optimization. Through this optimization, the kernel does not, on return from the remotely invoked real method, need to map the server stack back into the kernel's address space in order to transfer output parameters. Those skilled in the art will appreciate that this stack may be released from the kernel's address space when the stack is not needed by the kernel for the copying of stack data.

The real method 622 executes in its normal fashion until the central processing unit encounters the method's return instruction. At this point, the central processing unit pops the return thunk address off the stack and transfers control to the return thunk. The return thunk then traps to the kernel.

When the kernel receives processing control, it transfers any output data directly from the server stack to the client stack. After conducting this copying, the kernel transfers processing control to the client process to complete the remote invocation of the real method. Once the kernel has processing control, it retrieves the pointer to the client thread structure 666 from the server thread structure 667. Using the data stored in client thread structure (e.g., an address for the client process' page table), the kernel performs a context switch that maps the client process into the application program's protected address space 430. The kernel then retrieves the client threads stack pointer from the client thread structure 666. Using the client's thread's stack pointer, the kernel can copy the real method's output data directly from the mapped server stack 668 to the client stack 641. The kernel determines how to copy this stack data by retrieving the return signature 830 from the signature table entry 669. The kernel locates the signature table entry by retrieving the previously stored signature table entry pointer from the server thread structure 667. For example, in a preferred embodiment, the return signature is a pointer to code that locates parameters on the server stack by indexing a predefined distance away from the contents of the stack pointer. After locating the parameters, the return signature code copies the data associated with the parameters from the mapped server stack to the client stack. After this copying, the kernel releases the server thread and returns to the client process. At this point, the client process has, stored on its stack, the output parameters of the remotely invoked real method 622. Consequently, the client process can now continue processing in its normal fashion. In this manner, the present invention provides a facility for the remote invocation of procedures that minimizes processing overhead. Having described the invention generally, the invention will now be described by way of example with reference to FIGS. 9A, 9B, 9C, 9D, and 9E. In these Figures, the acronyms "SP" and "IP" stand for "stack pointer" and "instruction pointer," respectively.

Figures 9A, 9B, 9C:
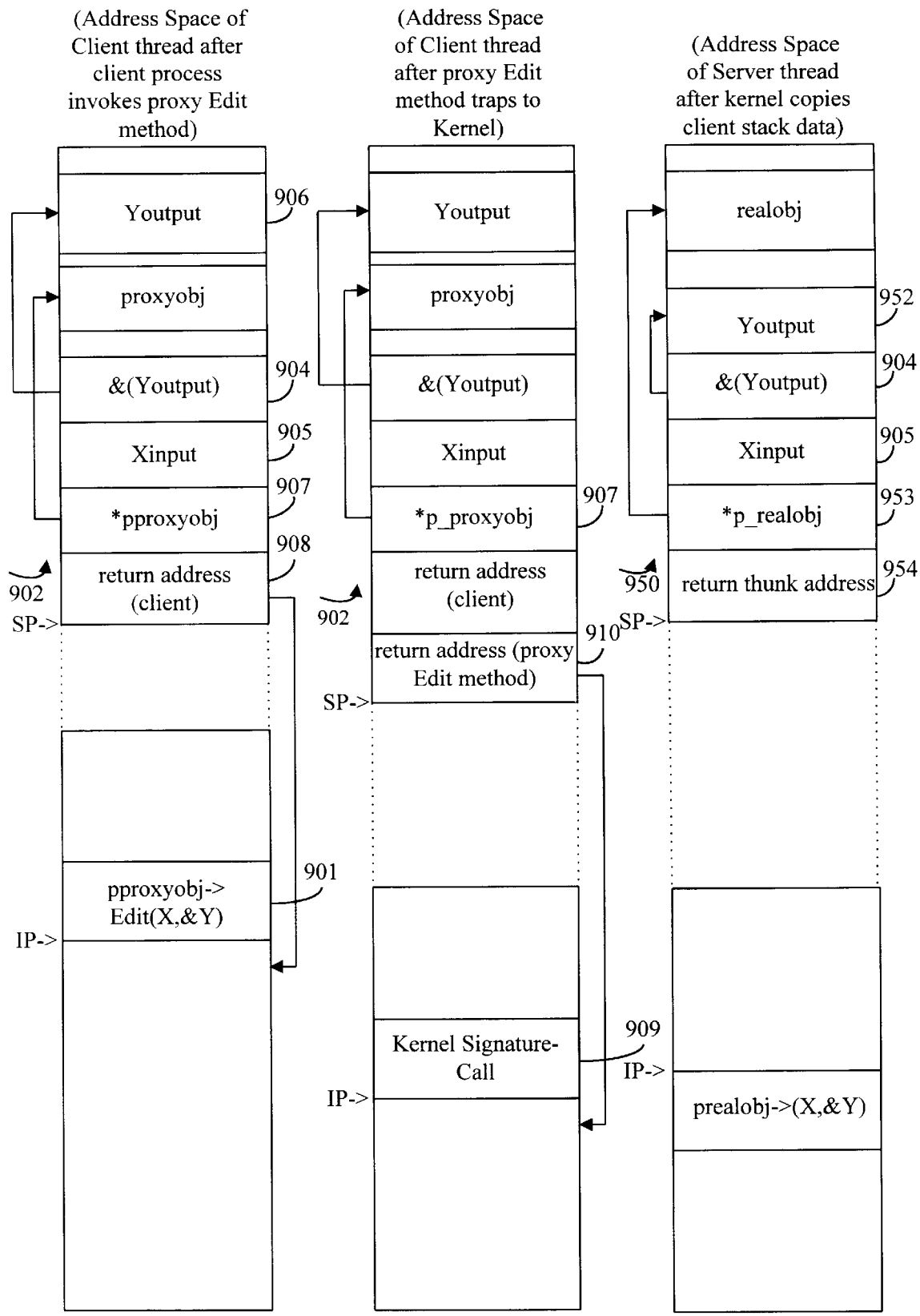
FIG. 9A illustrates an address space of a client thread after a client process has invoked a proxy object method.
FIG. 9B illustrates the address space of the client thread after the proxy object has loaded a register with the virtual function table index and trapped to the kernel.
FIG. 9C illustrates an address space of a server thread after the kernel has copied client stack data to a server stack.

FIG. 9A illustrates an address space of a client thread after the client has invoked a proxy object method. More specifically, the client thread is illustrated as having the data present immediately after the invocation of the proxy Edit method 901. As previously described, this method has an "X" input parameter and an address of variable "Y" as an output parameter. By invoking the proxy Edit method, the client process indirectly pushes, onto the client stack 902, the "&Y" output parameter 904, the "X" input parameter 905, the contents of the proxy object pointer 907, and a return address 908 for the client process. The actual value of the "Y" variable is stored in the location referenced by 906.

FIG. 9B illustrates the address space of a client thread after the proxy Edit method has loaded the register with the virtual table index and trapped to the kernel. The proxy Edit method traps to a Kernel-Call Routine 909. In this case, the invocation of the Kernel-Call Routine causes the central processing unit to push the return address of the proxy Edit method 910 onto the client stack 902. The Kernel-Call Routine retrieves the contents of the proxy object pointer 907 from the client thread stack. The Kernel-Call Routine uses the proxy object pointer to access the process object's instance data structure. The kernel then retrieves the resource identifier from the proxy object's instance data structure and uses this resource identifier to determine a resource table entry for the real object. Having determined the resource table entry, the kernel uses the process identifier of the resource table entry to retrieve a server thread, from the server thread pool, of the real Edit method. By definition, this server thread includes a server thread stack 950 (FIG. 9C). The routine then maps the server thread stack into the kernel's address space. As the kernel currently has access to the client thread stack via the application program's protected address space, this mapping allows for the direct copying of parameters between the server thread stack and the client thread stack. The routine uses the resource table entry's signature table pointer to determine the location of the real object's signature table. Subsequently, the Kernel-Call Routine utilizes the virtual table index passed from the proxy object to determine the signature table entry for the real object. By using the call signature of the signature table entry, the kernel copies the input and output parameters from the client stack to the server stack.

FIG. 9C illustrates the server thread after the kernel has copied the client stack data to the server stack. The Kernel-Call Routine copies the "X" input parameter 905 and the "&Y" output parameter 904 to locations that directly correlate to locations of the client stack. That is, the input and output parameters on each stack are stored at locations that, relative to their respective stack pointers, are identical. In addition, the kernel modifies, on the server stack 950, the contents of the "&Y" output parameter 904. More specifically, the kernel modifies the "&Y" output parameter to reference a position 952 of the server thread stack. By modifying the address in this manner the real method is able to execute using the server stack data. The Kernel-Call Routine also retrieves the real object pointer from the resource table entry and stores the contents of this pointer 953 in the server thread stack. Storing the real object pointer on the client stack informs the real method that it is being invoked to act upon its own real object. The routine further stores the return thunk address 954 on the server thread stack so that after the real method has completed its execution the method will return to the kernel. At this point, the server thread stack has all the data it needs to complete its execution. However, before allowing the real method to execute, the present invention stores a pointer to the client thread and a pointer to the signature table entry in the server thread structure. These two pointers will be utilized later to return output parameters and process control to the client process.

FIG. 9D illustrates the server thread after the real method has executed and returned to the kernel. At this point, the "Y" variable 952 contains the results of the executed real method. After the central processing unit has executed the real method's return instruction 962, the central processing unit directs processing control to the return thunk via the return thunk address 954. The return thunk traps to a Kernel-Return Routine which retrieves the pointer to the client thread from the server thread structure and performs a context switch to access the client's address space. As mentioned above, via this context switch, the kernel can directly transfer output parameters and associated data from the mapped server stack to the client stack. The routine retrieves the pointer to the signature table entry from the server thread structure in order to discern the proper return signature for the real method. In this case, the return signature identifies a single output parameter and locates this output parameter's address (i.e., the address of output parameter "&Y"). There are a number of possible variations as to how the routine locates addresses of output parameters. For example, in a first embodiment, the routine retrieves the stack pointer from the client thread structure and through knowledge of the return signature, locates the position on the client stack 904 that contains the "&Y" output parameter. By examining the contents of this stack location, the routine determines the position 906 on the client stack that holds the data for the "Y" variable. In a second embodiment, the call signature saves pointer values to output data locations in the server thread structure. In this embodiment, the routine dereferences these pointers to determine the locations of output data. After locating the address of the "&Y" output parameter, the routine copies the value of the "Y" variable from server stack location 952 of FIG. 9D to the client stack location 906 of FIG. 9E. FIG. 9E thus illustrates the state of the client thread after the kernel has copied the output data. Having described an overview of the invention, as well as an example of the invention, a comprehensive summary of the processing steps for a preferred embodiment of the present invention will now be described with reference to FIGS. 10, 11, and 12.

Figure 10:
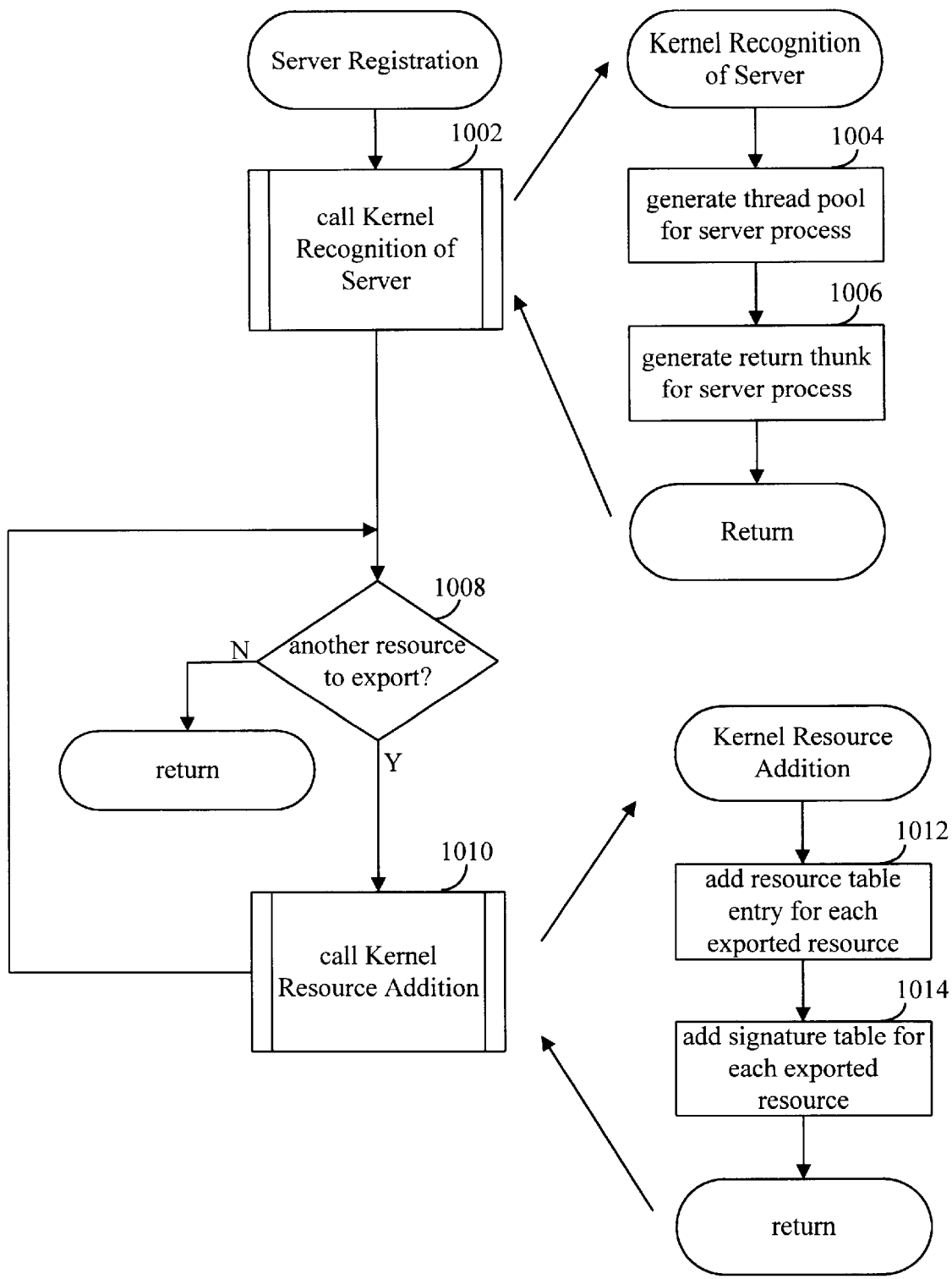
FIG. 10 illustrates a flow diagram for the processing steps of a Server Registration Routine, a Kernel Recognition of Server Routine, and a Resource Addition Routine.

FIG. 10 illustrates a flow diagram for the processing steps of a Server Registration Routine, a Kernel Recognition of Server Routine, and a Kernel Resource Addition Routine. These routines interact to render a real object of a server process available to client processes. The Server Registration Routine is called by a server process when the server process desires to register itself as a server with the kernel. The Server ID process begins by calling the Kernel Recognition of Server Routine (step 1002). The Kernel Recognition of Server Routine generates a thread pool and a return thunk for the server (steps 1004 and 1006). Subsequently, the Kernel Recognition of Server Routine returns to the Server Registration Routine. The Server Registration Routine continues its processing by calling the Kernel Resource Addition Routine for each resource that the server process desires to export (steps 1008 and 1010). The Kernel Resource Addition Routine responds by adding a resource table entry and a signature table for each exported resource (steps 1012 and 1014).

Figure 11:
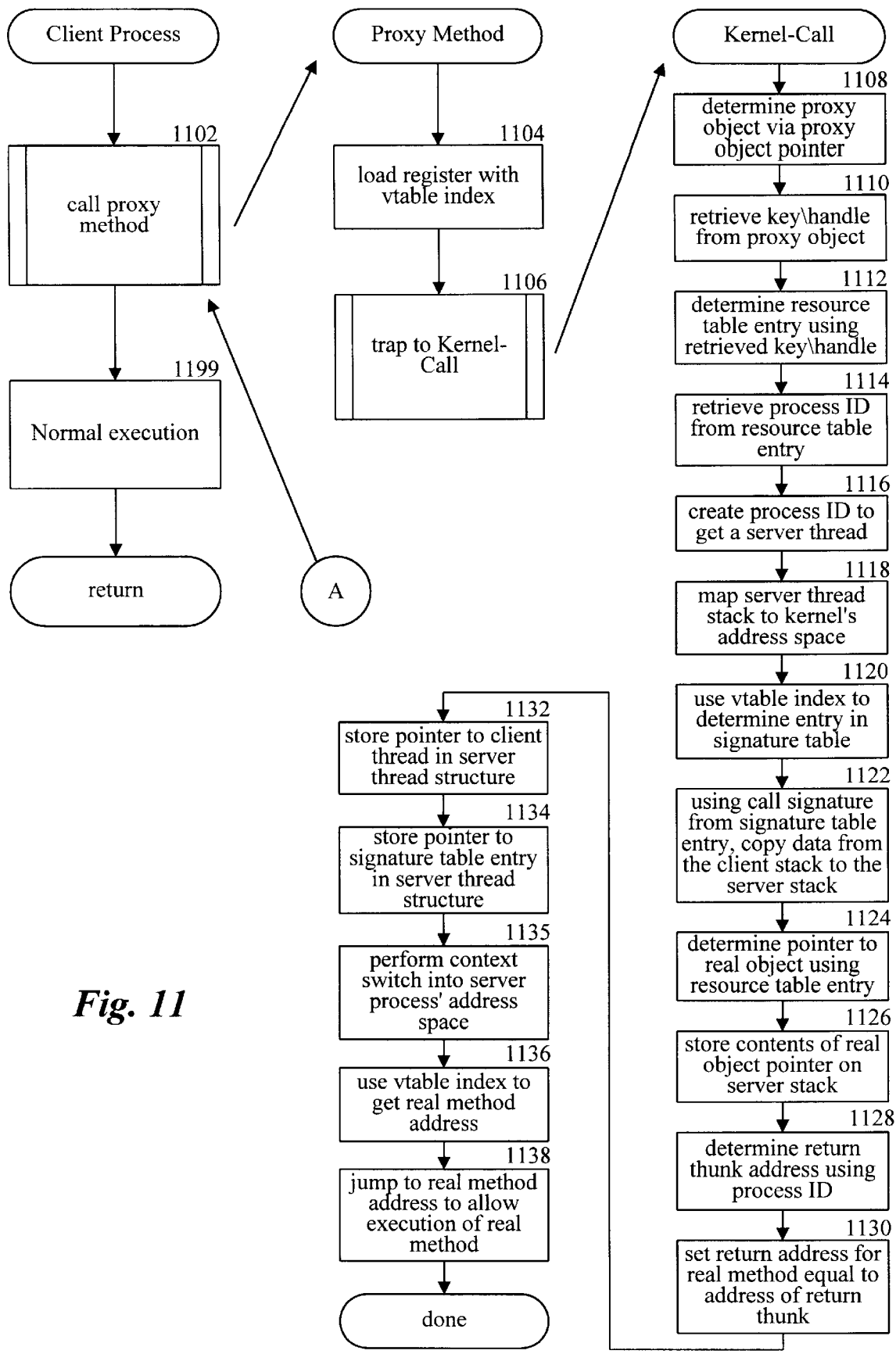
FIG. 11 illustrates a flow diagram for the processing steps for the client process, a proxy method, and a Kernel-Call Routine.

FIG. 11 illustrates a flow diagram for the processing steps for the client process, the edit proxy, and the Kernel-Call Routine. These three entities interact to render the real object of the server process suitable for execution by conducting direct stack-to-stack transfer. The client process begins by calling the proxy Edit method (step 1102). The proxy method loads a register with a virtual table index and traps to the Kernel-Call Routine (steps 1104 and 1106). The Kernel-Call Routine then determines the location of the proxy object via the proxy object pointer (step 1108). Using this proxy object pointer the routine retrieves a resource identifier from the instance data structure of the proxy object (e.g., in the preferred embodiment of the present invention, the routine retrieves a handlekey pair, step 1110). The routine then determines a resource table entry using the retrieved resource identifier (step 1112). Using the server identifier contained within the resource table entry, the routine creates, in the previously allocated thread pool, a server thread for the real object method (steps 1114 and 1116). Alternatively, for cases where a previously-created thread is available, the routine will retrieve the available thread from the thread pool. Subsequently, the routine maps the server thread stack into the kernel's address space (step 1118). By utilizing the passed virtual table index in conjunction with the resource table entry's signature table pointer, the routine determines a signature table entry (step 1120). The present invention, in conformity with the call signature of the determined signature table entry, copies input and output data directly from the client stack to the server stack (step 1122). In conducting this copying, the present invention allocates stack storage not only for pointers to parameters but for the actual parameters as well. By modifying the parameter pointers to reference the allocated stack storage areas of the actual parameters, the present invention allows the real method to execute using its own stack data. The routine next determines the address of the real object using the resource table entry's real object pointer (step 1124). The present invention then stores this address in the server stack (step 1126). Additionally, the routine retrieves a return thunk from the process ID structure and stores the return thunk in the return address pointer location of the stack (steps 1128 and 1130). The kernel also stores a client thread pointer and a signature table entry pointer in the server thread structure (steps 1132 and 1134). As will be explained with reference to FIG. 12, these pointers are later used to facilitate the copying of return parameters to the client stack. The routine then performs a context switch into the server process' address space (1135). Subsequently, the routine uses the passed virtual table index in conjunction with the resource table's virtual table pointer to discern the actual address of the real method (step 1136). Having determined this address, the routine jumps to the real method's address in order to allow the real method to execute using the copied stack data (step 1138).

Figure 12:
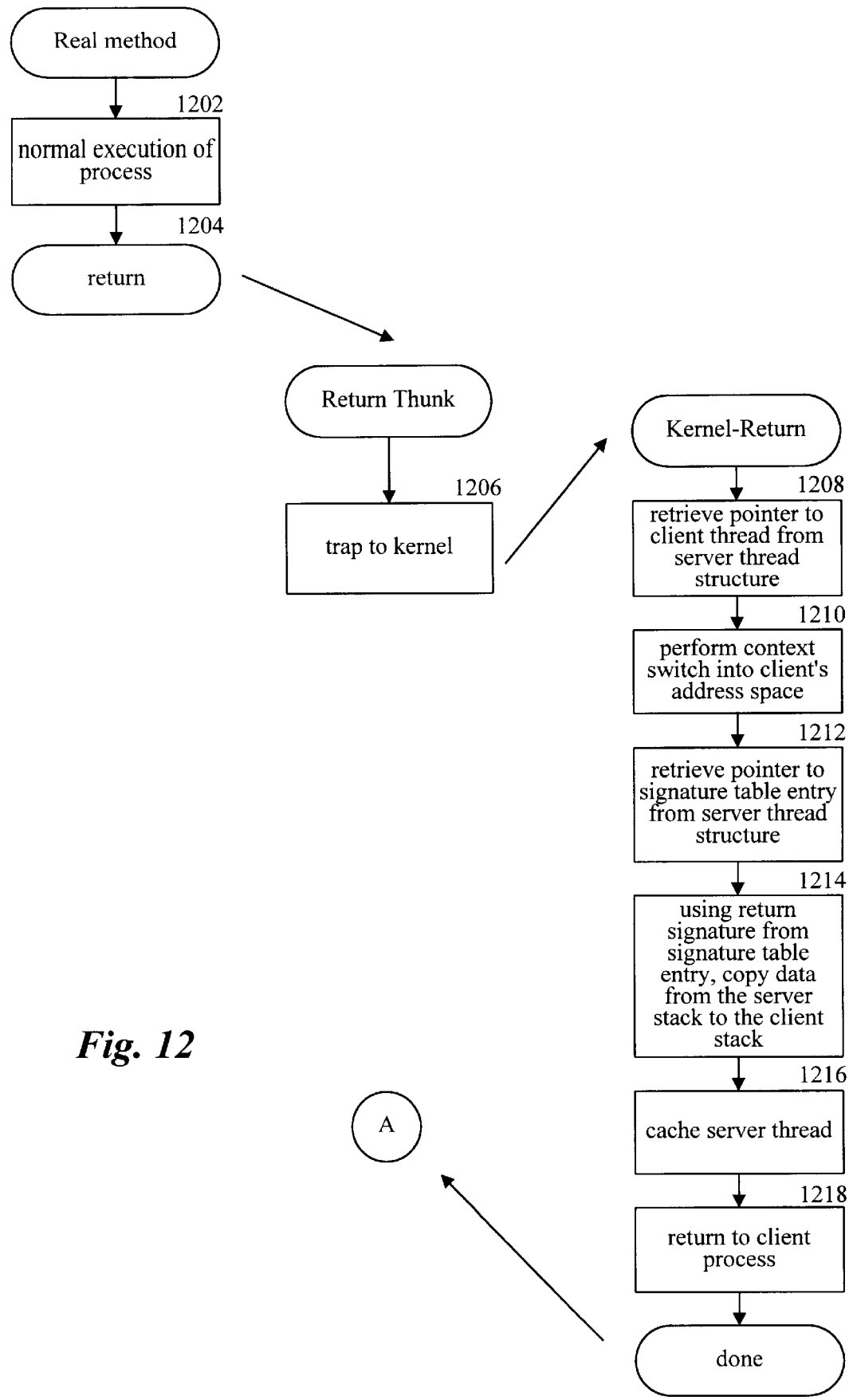
FIG. 12 illustrates a flow diagram for the processing steps of the real method, a return thunk, and a Kernel-Return Routine.

FIG. 12 illustrates a flow diagram for the processing steps of the real method, the return thunk, and the Kernel-Return Routine. Collectively, these three entities describe the processing steps for the execution of the real object and for the transferring of output parameters from the server stack to the client stack. After the Kernel-Call Routine has jumped to the real method, the real method executes in its normal fashion (step 1202). However, when the central processing unit executes the return instruction for the real method, the central processing unit pops the return thunk address off of the server stack and causes execution to be transferred to the returned thunk (step 1204). The return traps to the kernel (step 1206). More specifically, the return thunk traps to the Kernel-Return Routine. This routine retrieves the pointer to the client thread from the server thread structure (step 1208). After retrieving the pointer to the client thread, the routine performs a context switch into the client's address space (step 1210). By identifying the client thread, the routine can discern the stack pointer for the client thread. The routine then retrieves the previously stored pointer to the real object's signature table entry (step 1212). By dereferencing the retrieved pointer, the routine discerns the real object's return signature. The present invention then, in conformity with the return signature, copies output parameters directly from the server stack to the client stack (step 1214). After this data has been copied, the preferred embodiment caches the server thread in the thread pool (step 1216). Subsequently, the routine returns to the client process and the client process continues with its normal execution (steps 1218 and 1199). In this manner, the present invention is able to remotely invoke procedures without undergoing the normal marshalling/unmarshalling techniques.

The detailed discussion provided above represents only a preferred embodiment of the present invention. The above description will enable those skilled in the art to make various modifications to the preferred embodiment that do not depart from the spirit and scope of the invention. For example, although the above-detailed description explains the present invention as it exists in an object-oriented environment, those skilled in the art will appreciate that the present invention is not limited to an object-oriented environment. Similarly, while a preferred embodiment has been described as mapping a server stack into the kernel's address space, those skilled in the art will appreciate that the client's stack could, instead of the server stack, or in addition to the server stack, be mapped into the kernel's address space to facilitate the direct copying of stack data. Further, while the above-described preferred embodiment references a completely stack-based calling convention, those skilled in the art will realize that the invention concepts disclosed within are equally applicable to calling conventions that use registers, as well as stack locations, to transfer parameters between processes. Accordingly, the present invention encompasses all modifications to the described preferred embodiment that read on the appended claims and equivalents thereof.

What is claimed is:

1. In a computer system having a first process in a first address space, a second process in a second address space, and a managing address space that is authorized to access the first address space and the second address space, a method for transferring information between the first process and the second process, comprising the steps of:

mapping a portion of the second address space into the managing address space so as to provide the managing address space with access to the mapped portion, wherein the mapped portion of the second address space is a stack of a procedure contained within the second address space;

identifying a stack for a procedure contained within the first address space; and while the managing address space has access to the first address space, copying the information between the mapped portion of the second address space and the first address space by transferring the information directly between the stack of the procedure contained within the second address space and the stack of the procedure contained within the first address space.

2. The method of claim 1 wherein the step of transferring the information directly between the stack of the procedure contained within the second address space and the stack of the procedure contained within the first address space comprises the steps of:

identifying a parameter to be transferred between the stacks;

when the identified parameter points to a stack location, retrieving a datum contained within the stack location, and transferring the datum, as well as the parameter that points to the datum, between the stacks so that a pointer on each stack points to a location of its own stack that is allocated to store the datum.

3. The method of claim 1 wherein the procedure contained within the second address space is a client procedure, wherein the procedure contained within the first address space is a server procedure, and wherein the step of transferring the information directly between the stack of the procedure contained within the second address space and the stack of the procedure contained within the first address space comprises the substeps of:

identifying a parameter on the stack of the client procedure; and when the identified parameter points to a location on the stack of the client procedure, allocating, on the stack of the server procedure, a pointer that points to a location on the stack of the server procedure.

4. The method of claim 1 wherein the second process is a client process.

5. The method of claim 1 wherein the second process is a server process.

6. The method of claim 3 further comprising the steps of when the identified parameter is an input parameter of the server procedure, retrieving, from the stack of the client procedure, a datum from the location pointed to by the input parameter; and copying, on the stack of the server procedure, the retrieved datum into the location pointed to by the allocated pointer.

7. The method of claim 3, further comprising the steps of:

returning to the managing address space after the server procedure has completed its execution;

after returning to the managing address space, determining any output parameters of the server procedure, and for each determined output parameter, copying the output parameter directly from the stack of the server procedure to the stack of the client procedure.

8. The method of claim 6, further comprising the step of:

after copying the datum, allowing the server procedure to execute.

9. In a computer system having a kernel for managing resources of a computer system, a method for invoking a server procedure from a client procedure, the client procedure having a client procedure stack, the server procedure having a server procedure stack, the server procedure having at least one parameter, wherein the kernel performs the computer-implemented steps of:

receiving, from the client process, a request to invoke the server procedure;

mapping the server procedure stack into an address space of the kernel;

when the server procedure utilizes an input parameter, directly copying the input parameter from the client procedure stack to the server procedure stack so as to allow the server procedure to execute using the copied input parameter; and when the server procedure utilizes an output parameter, directly copying the output parameter from the server procedure stack to the client procedure stack after the server procedure has completed its execution.

10. The method of claim 9, the method further comprising the computer-implemented step of:

storing, in a return address pointer of the server procedure stack, an address of a return thunk, the return thunk having code that returns to the kernel, so as to facilitate a return to the kernel after the server procedure has completed its execution.

11. The method of claim 9, further comprising the step of:

when a parameter of the server procedure is a pointer, allocating, at a first address of the server procedure stack, a storage area for a datum of the pointer, allocating, at a second address of the server procedure stack, a second storage area for the pointer, and storing the first address in the second address so that the second storage area points to the first storage area.

12. In a computer system having a first address space containing a first procedure, a second address space containing a second procedure, and a kernel address space, a method for transferring parameter data between the first and the second procedures, the method comprising the steps of:

mapping a stack of the second procedure into the kernel address space; and copying stack data directly between the mapped stack and a stack of the first procedure.

13. The method of claim 12 wherein the first procedure traps to the kernel address space by issuing a request to invoke the second procedure.

14. The method of claim 12 wherein the kernel maintains a prototype structure that specifies a call frame format for the second procedure, and wherein the step of copying stack data directly between the mapped stack and the stack of the first procedure comprises the substeps of:

retrieving, from the prototype structure, the call frame format of the second procedure; and copying parameters of the second procedure between the mapped stack and the stack of the first procedure in accordance with the retrieved call frame format.

15. In a computer system having a main memory that comprises a first address space having a first routine, a second address space having a second routine, and a third address space containing an operating system component, a method for responding to a request to remotely invoke the second routine, the method comprising the steps of:

receiving, in the third address space, a request from the first routine to invoke the second routine;

preserving, in the main memory, a return address for the first routine;

locating, on a stack of the first routine, any input parameters of the second routine;

mapping the stack of the first routine into the third address space to facilitate the copying of parameters between the stack of the first routine and a stack of the second routine;

for each located input parameter, directly copying the input parameter from the stack of the first routine to the stack of the second routine to allow the second routine to execute using data contained on its own stack; and once that the second routine has completed its execution, locating, on the stack of the second routine, any output parameters of the second routine, for each located output parameter, copying the located output parameter from the stack of the second routine to the stack of the first routine, and returning to the first routine at the location of the preserved address.

16. The method of claim 15 wherein the first routine issues the request to invoke the second routine by performing the step of:

specifying an identifier of the second routine prior to trapping to the operating system component.

17. The method of claim 15, further comprising the step of:

mapping the stack of the second routine into the third address space to facilitate the copying of parameters between the stack of the first routine and the stack of the second routine.

18. The method of claim 15 wherein the operating system component maintains a call frame structure, the call frame structure comprising a plurality of call frame signatures, each call frame signature specifying a format of a call frame for a respective server routine, the method further comprising the step of:

after receiving the request from the first routine to invoke the second routine, retrieving, from the call frame structure, a call frame signature for the second routine, and allocating, in accordance with the retrieved call frame signature, storage on the stack of the second routine.

19. The method of claim 16 wherein the first routine is a proxy function of a proxy object and the second routine is an implemented function of a real object, wherein the specified identifier is a virtual function table index of the proxy object, and wherein operating system component maintains a stack format structure comprising a plurality of entries, each entry specifying parameters for a respective function of the real object, the method further comprising the steps of:

determining an entry of the stack format structure that specifies parameters of the implemented function by using the specified identifier as an index into the stack format structure; and allocating space on the stack of the second routine in accordance with the determined entry of the stack format structure.

20. The method of claim 18 wherein the step of allocating, in accordance with the retrieved call frame signature, storage on the stack of the second routine comprises the substeps of:

determining, via the retrieved call frame signature, when a parameter of the second routine that points to a memory location; and for each determined parameter, allocating, on the stack of the second routine, a first storage area for the determined parameter, and a second storage area for the memory location, and loading the contents of the first storage area with an address of the second storage area so that the first storage area points to the second storage area.

21. In a computer system having a main memory that comprises a kernel in a kernel address space, a client process in a client address space, a method for allowing the client process to invoke a server procedure, the method comprising the steps of:

receiving, in the kernel address space, a request from the client process to invoke the server procedure;

preserving, in the main memory, a return address for the client process;

determining a stack frame structure of the server procedure, the stack frame structure specifying a format for parameters of the server procedure;

using the kernel to create a stack for the server procedure;

mapping the stack of the server procedure into the kernel address space so as to provide for direct copying of parameters between a stack of the client process and the stack of the server procedure;

copying, in accordance with the determined stack frame structure, the parameters directly from the stack of the client process to the stack of the server procedure;

storing, in the stack of the server procedure, an address of a return thunk so that when the server procedure has completed its execution it will return to the return thunk; and when the server procedure has completed its execution,
returning to the kernel via the return thunk,
copying any output parameters directly from the stack of the server procedure to the stack of the client process,
retrieving, from the main memory, the preserved return address of the client process, and
using the retrieved return address to return to the client process.

22. The method of claim 21, wherein the step of copying, in accordance with the determined stack frame structure, the parameters directly from the stack of the client process to the stack of the server procedure comprises the step of:

reserving, in the stack of the server procedure, storage areas for the parameters of the server procedure that are specified by the determined stack frame structure.

23. The method of claim 22 wherein the step of reserving, in the stack of the server procedure, the storage areas for the parameters of the server procedure comprises the step of:

for any parameter that points to a variable,
allocating a storage area for the variable in the stack of the server process, and
allocating a pointer in the stack of the server process so that the pointer references the allocated storage area for the variable.

24. In a computer system having a first address space containing a first process, the first process having a first stack, a second address space containing a second process, the second process having a second stack, and an authorized address space, the authorized address space being entitled to access the first and the second address spaces, an apparatus for transferring data between the first and the second address spaces, the apparatus comprising:

a mapping device that maps the first stack into the authorized address space; and a transfer device that copies stack data between the first stack and the second stack while the mapping device has the first stack mapped into the authorized address space.

25. The apparatus of claim 24 wherein the first stack is the stack of a server procedure and the second stack is the stack of a client procedure, the apparatus further comprising:

a receiver, in the authorized address space, to receive a request to remotely invoke the server procedure; and a signature determining device that discerns a format for the stack data that the transfer device copies between the first stack and the second stack.

26. The apparatus of claim 25 wherein the signature determining device comprises:

a pointer identifying device that determines when the stack data is a pointer parameter of the second stack, the pointer parameter pointing to a memory location of the second stack; and an allocator that allocates storage areas on the first stack and wherein the allocator, for each determined pointer parameter, allocates storage for the pointer parameter and the memory location so that the allocated storage for the pointer parameter points to the allocated storage for the memory location.

27. In a computer system having a kernel in a kernel address space, an apparatus for allowing a client process to remotely invoke a server procedure, the client process existing in a client address space and having a client stack, the server procedure existing in a server address space and having a server stack, the server procedure utilizing a parameter, the apparatus comprising:

a signature specifier that provides a format that the server procedure uses to access its parameter; and a copier that directly transfers the parameter between the client stack and the server stack in accordance with the format provided by the signature specifier, wherein the copier comprises a mapping component that selectively maps at least one of the two stacks into the kernel address space to facilitate the direct transfer of the parameter between the client stack and the server stack.

28. The apparatus of claim 27, further comprising:

a return thunk having an address in the server address space, the return thunk providing a mechanism that returns from the server address space to the kernel address space;

a storing device that stores the address of the return thunk in a return address pointer of the server procedure so that the server procedure returns to the return thunk when the server procedure completes its execution.

29. The apparatus of claim 28, the apparatus further comprising:

a pointer identifying component that determines when the parameter is a pointer; and a pointer resolving device that, allocates on the server stack, storage for the pointer and storage for a memory location of the server stack that is pointed to by the pointer.

30. A computer-readable medium containing instructions for controlling a computer system to transfer information between a first process and a second process, the first process having a first address space and the second process having a second address space, the computer system having a managing address space that is authorized to access the first address space and the second address space, by performing the steps of:

mapping a portion of the second address space into the managing address space so as to provide the managing address space with access to the mapped portion; and while the managing address space has access to the first address space, copying the information between the mapped portion of the second address space and the first address space.

31. The computer-readable medium of claim 30 wherein the mapped portion of the second address space is a stack of a procedure contained within the second address space, the method further comprising the steps of:

identifying a stack for a procedure contained within the first address space; and transferring the information directly between the stack of the procedure contained within the second address space and the stack of the procedure contained within the first address space.

32. The computer-readable medium of claim 30 wherein the second process is a client process.

33. The computer-readable medium of claim 30 wherein the second process is a server process.

34. The computer-readable medium of claim 31 wherein the step of transferring the information directly between the stack of the procedure contained within the second address space and the stack of the procedure contained within the first address space comprises the steps of:

identifying a parameter to be transferred between the stacks; and when the identified parameter points to a stack location, retrieving a datum contained within the stack location, and transferring the datum, as well as the parameter that points to the datum, between the stacks so that a pointer on each stack points to a location of its own stack that is allocated to store the datum.

35. The computer-readable medium of claim 31 wherein the procedure contained within the second address space is a client procedure, wherein the procedure contained within the first address space is a server procedure, and wherein the step of transferring the information directly between the stack of the procedure contained within the second address space and the stack of the procedure contained within the first address space comprises the substeps of:

identifying a parameter on the stack of the client procedure; and when the identified parameter points to a location on the stack of the client procedure, allocating, on the stack of the server procedure, a pointer that points to a location on the stack of the server procedure.

36. The computer-readable medium of claim 35, further comprising the steps of:

when the identified parameter is an input parameter of the server procedure, retrieving, from the stack of the client procedure, a datum from the location pointed to by the input parameter; and copying, on the stack of the server procedure, the retrieved datum into the location pointed to by the allocated pointer.

37. The computer-readable medium of claim 35, further comprising the steps of:

returning to the managing address space after the server procedure has completed its execution; and after returning to the managing address space, determining any output parameters of the server procedure, and for each determined output parameter, copying the output parameter directly from the stack of the server procedure to the stack of the client procedure.

38. The computer-readable medium of claim 36, further comprising the step of:

after copying the datum, allowing the server procedure to execute.

39. A computer-readable medium containing instructions for controlling a kernel of a computer system to invoke a server procedure of a server process from a client procedure of a client process, the kernel for managing resources of the computer system, the client procedure having a client procedure stack, the server procedure having a server procedure stack, the server procedure having at least one parameter, by performing the steps of:

receiving, from the client process, a request to invoke the server procedure;

mapping the server procedure stack into an address space of the kernel;

when the server procedure utilizes an input parameter, directly copying the input parameter from the client procedure stack to the server procedure stack so as to allow the server procedure to execute using the copied input parameter; and when the server procedure utilizes an output parameter, directly copying the output parameter from the server procedure stack to the client procedure stack after the server procedure has completed its execution.

40. The computer-readable medium of claim 39, further including the step of:

storing, in a return address pointer of the server procedure stack, an address of a return thunk, the return thunk having code that returns to the kernel so as to facilitate a return to the kernel after the server procedure has completed its execution.

41. The computer-readable medium of claim 39, comprising the steps of:

when a parameter of the server procedure is a pointer, allocating, at a first address of the server procedure stack, a storage area for a datum of the pointer, allocating, at a second address of the server procedure stack, a second storage area for the pointer, and storing the first address in the second address so that the second storage area points to the first storage area.

42. A computer-readable medium containing instructions for controlling a computer system to transfer parameter data between a first procedure and a first address space and a second procedure in a second address space, the computer system having a kernel address space, by performing the steps of:

mapping a stack of the second procedure into the kernel address space; and copying stack data directly between the mapped stack and a stack of the first procedure.

43. The computer-readable medium of claim 42 wherein the first procedure traps to the kernel address space by issuing a request to invoke the second procedure.

44. The computer-readable medium of claim 42 wherein the kernel maintains a prototype structure that specifies a call frame format for the second procedure, and wherein the step of copying stack data directly between the mapped stack and the stack of the first procedure comprises the substeps of:

retrieving, from the prototype structure, the call frame format of the second procedure; and copying parameters of the second procedure between the mapped stack and the stack of the first procedure in accordance with the retrieved call frame format.

45. A method in a computer system for a client procedure of a client computer program in a client address space to invoke a server procedure of a server computer program in a server address space, the computer system having a kernel in a kernel address space for facilitating the invocation of the server procedure, the method performed by the kernel, comprising the steps of:

receiving a first request to invoke the server procedure from the client procedure such that the kernel has access to a client stack in the client address space, the client stack containing first data for the invocation of the server procedure;

identifying in the server address space a server stack for the invocation of the server procedure;

mapping the server stack into the kernel address space; and while the server stack remains mapped into the kernel address space,
directly copying the first data from the client stack to the server stack;
gaining access to the server address space;
invoking the server procedure wherein results of the invocation of the server procedure are stored onto the server stack;
gaining access to the client address space;
directly copying the results from the server stack to the client stack so that the client procedure is able to access the results to complete the server procedure invocation of the first request;
receiving a second request to invoke the server procedure from the client procedure, wherein the client stack contains second data for the invocation of the server procedure;
directly copying the second data from the client stack to the server stack; and
invoking the server procedure for a second time with the server stack.

46. A method in a computer system for callers to invoke a remote procedure of a remote process, each of the callers being in an address space, the remote process being in an address space that is remote with respect to each of the address spaces of the callers, the computer system having a kernel for facilitating the invocation of the remote procedure, the method performed by the kernel, comprising the steps of:

receiving a first request from one of the callers to invoke the remote procedure such that the kernel has access to the address space of the one caller, the one caller having a stack containing first data to be used during the remote procedure invocation;

creating a stack for the remote procedure in the remote address space and mapping the created stack into the kernel address space; and while the mapped stack remains mapped into the kernel address space,
directly copying the data from the stack of the one caller to the mapped stack and invoking the remote procedure;
receiving a second request from another one of the callers to invoke the remote procedure, the another caller having a stack containing second data to be used during the remote procedure invocation; and
directly copying the second data from the stack of the another caller to the mapped stack and invoking the remote procedure for a second time with the mapped stack.

47. The method of claim 46, further including the steps of:

while the mapped stack remains mapped into the kernel address space,
receiving a plurality of requests from a plurality of the callers to invoke the remote procedure, each of the plurality of the callers having a caller stack with procedure data for the invocation of the remote procedure; and
for each of the plurality of the requests,
directly copying the procedure data from the caller stack of the caller to the mapped stack and invoking the remote procedure with the mapped stack.

48. A computer-readable medium containing instructions for controlling a computer system to perform a method for a client procedure of a client computer program in a client address space to invoke a server procedure of a server computer program in a server address space, the computer system having a kernel in a kernel address space for facilitating the invocation of the server procedure, the method performed by the kernel, comprising the steps of:

receiving a first request to invoke the server procedure from the client procedure such that the kernel has access to a client stack in the client address space, the client stack containing first data for the invocation of the server procedure;

identifying in the server address space a server stack for the invocation of the server procedure;

mapping the server stack into the kernel address space; and while the server stack remains mapped into the kernel address space,
directly copying the first data from the client stack to the server stack;
gaining access to the server address space;
invoking the server procedure wherein results of the invocation of the server procedure are stored onto the server stack;
gaining access to the client address space;
directly copying the results from the server stack to the client stack so that the client procedure is able to access the results to complete the server procedure invocation of the first request;
receiving a second request to invoke the server procedure from the client procedure, wherein the client stack contains second data for the invocation of the server procedure;
directly copying the second data from the client stack to the server stack; and
invoking the server procedure for a second time with the server stack.

49. A computer-readable medium containing instructions for controlling a computer system to perform a method for callers to invoke a remote procedure of a remote process, each of the callers being in an address space, the remote process being in an address space that is remote with respect to each of the address spaces of the callers, the computer system having a kernel for facilitating the invocation of the remote procedure, the method performed by the kernel comprising the steps of:

receiving a first request from one of the callers to invoke the remote procedure such that the kernel has access to the address space of the one caller, the one caller having a stack containing first data to be used during the remote procedure invocation;

creating a stack for the remote procedure in the remote address space and mapping the created stack into the kernel address space; and while the mapped stack remains mapped into the kernel address space,
directly copying the data from the stack of the one caller to the mapped stack and invoking the remote procedure;
receiving a second request from another one of the callers to invoke the remote procedure, the another caller having a stack containing second data to be used during the remote procedure invocation; and
directly copying the second data from the stack of the another caller to the mapped stack and invoking the remote procedure for a second time with the mapped stack.

50. The computer-readable medium of claim 49 further including the steps of:

while the mapped stack remains mapped into the kernel address space,
receiving a plurality of requests from a plurality of the callers to invoke the remote procedure, each of the plurality of the callers having a caller stack with procedure data for the invocation of the remote procedure; and
for each of the plurality of the requests,
directly copying the procedure data from the caller stack of the caller to the mapped stack and invoking the remote procedure with the mapped stack.

* * * * *